US008960790B2

(12) United States Patent
Fujita et al.

(10) Patent No.: US 8,960,790 B2
(45) Date of Patent: Feb. 24, 2015

(54) VEHICLE SEAT

(75) Inventors: Etsunori Fujita, Hiroshima (JP); Seiji Kawasaki, Hiroshima (JP); Shigeyuki Kojima, Hiroshima (JP); Soichi Makita, Hiroshima (JP)

(73) Assignee: Delta Tooling Co., Ltd., Hiroshima-shi (JP)

( * ) Notice: Subject to any disclaimer, the term of this patent is extended or adjusted under 35 U.S.C. 154(b) by 361 days.

(21) Appl. No.: 13/391,461

(22) PCT Filed: Aug. 21, 2010

(86) PCT No.: PCT/JP2010/064121
§ 371 (c)(1),
(2), (4) Date: May 2, 2012

(87) PCT Pub. No.: WO2011/021705
PCT Pub. Date: Feb. 24, 2011

(65) Prior Publication Data
US 2012/0217775 A1 Aug. 30, 2012

(30) Foreign Application Priority Data

Aug. 21, 2009 (JP) ................................ 2009-192611

(51) Int. Cl.
*B60N 2/42* (2006.01)
*B60N 2/48* (2006.01)
(Continued)

(52) U.S. Cl.
CPC ............ *B60N 2/4228* (2013.01); *B60N 2/4221* (2013.01); *B60N 2/42709* (2013.01); *B60N 2/68* (2013.01)
USPC ................................ 297/216.13; 297/452.18

(58) Field of Classification Search
CPC ....... B60N 2/68; B60N 2/42709; B64D 25/04

USPC ............. 297/216.13, 216.14, 452.18, 452.34, 297/452.64, 284.11
See application file for complete search history.

(56) References Cited

U.S. PATENT DOCUMENTS

| 6,302,487 | B1 * | 10/2001 | Fujita et al. | ............... 297/452.56 |
| 6,554,356 | B1 * | 4/2003 | Crose | ........................ 297/216.13 |

(Continued)

FOREIGN PATENT DOCUMENTS

| JP | 02-162128 | 6/1990 |
| JP | 2510289 | 9/1996 |

(Continued)

OTHER PUBLICATIONS

U.S. Appl. No. 13/390,183, filed Feb. 13, 2012, Fujita, et al.
(Continued)

*Primary Examiner* — David R Dunn
*Assistant Examiner* — Tania Abraham
(74) *Attorney, Agent, or Firm* — Oblon, Spivak, McClelland, Maier & Neustadt, L.L.P.

(57) ABSTRACT

A vehicle seat includes a tension structure extended on a back frame with a configuration in which a natural frequency in the right-and-left direction of the back frame is set lower than the natural frequency in the front-and-rear direction. Thereby, the structure can easily deflect in the right-and-left direction. Therefore, since an impact load larger than a predetermined level inputted in the front-and-rear direction due to front-and-rear/pitching vibration or a rear collision and the like becomes a force of deflecting the back frame in the right-and-left direction, the vibration/impact energy is consumed by that, and moreover, rearward displacement of the back frame consumes vibration/impact energy. Thus, absorbing performances of the vibration/impact energy are higher than before.

18 Claims, 25 Drawing Sheets

(51) Int. Cl.
*B60N 2/68* (2006.01)
*B60N 2/427* (2006.01)

(56) References Cited

U.S. PATENT DOCUMENTS

| | | |
|---|---|---|
| 6,702,387 B2 * | 3/2004 | Munemura et al. ...... 297/452.18 |
| 6,767,055 B1 * | 7/2004 | Sparks ..................... 297/216.14 |
| 7,040,696 B2 * | 5/2006 | Vits et al. .................. 297/216.13 |
| 7,377,578 B2 * | 5/2008 | Ellison et al. ............ 296/193.07 |
| 7,731,292 B2 * | 6/2010 | Ishijima et al. .......... 297/452.18 |
| 8,104,832 B2 | 1/2012 | Fujita et al. |
| 2003/0116999 A1 | 6/2003 | Fujita et al. |
| 2005/0121585 A1 | 6/2005 | Minai et al. |
| 2006/0279120 A1 | 12/2006 | Fujita et al. |
| 2007/0205643 A1 | 9/2007 | Fujita et al. |

FOREIGN PATENT DOCUMENTS

| | | | |
|---|---|---|---|
| JP | 2857158 B2 * | 2/1999 | ............... B60N 2/44 |
| JP | 2003 182427 | 7/2003 | |
| JP | 2003-226179 | 8/2003 | |
| JP | 2005 112104 | 4/2005 | |
| JP | 2006 345952 | 12/2006 | |
| JP | 2009 040128 | 2/2009 | |
| WO | 2006 022186 | 3/2006 | |
| WO | 2006 022315 | 3/2006 | |

OTHER PUBLICATIONS

International Search Report issued on Sep. 14, 2010 in PCT/JP10/64121 filed on Aug. 21, 2010.

* cited by examiner

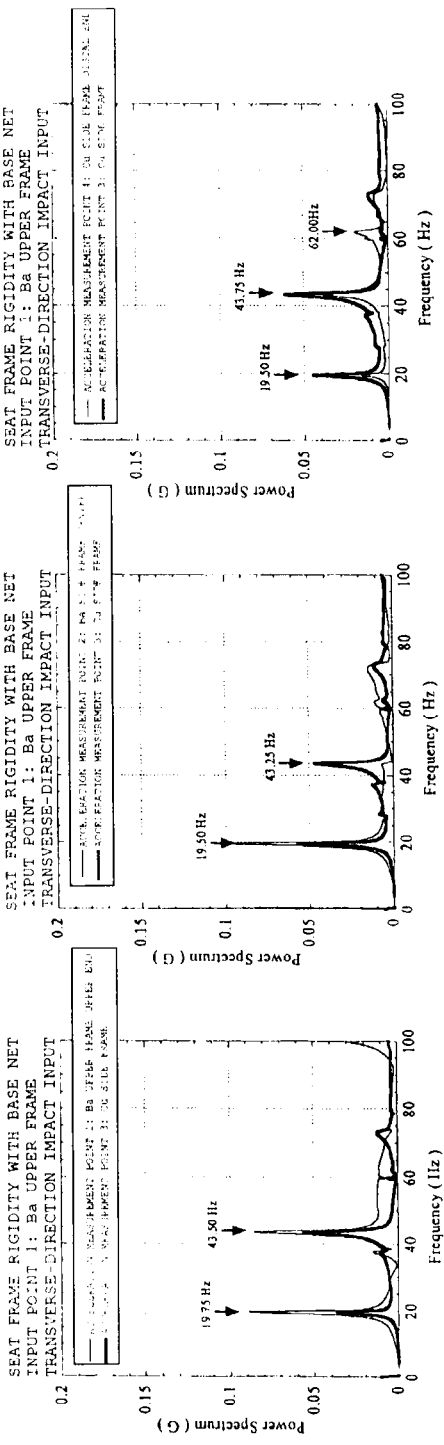

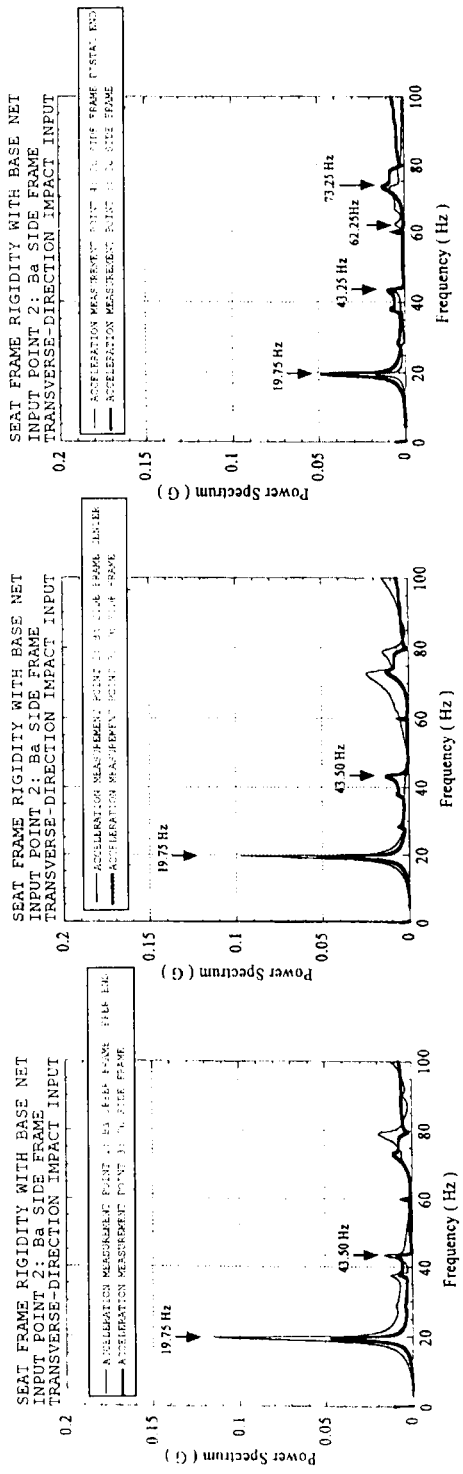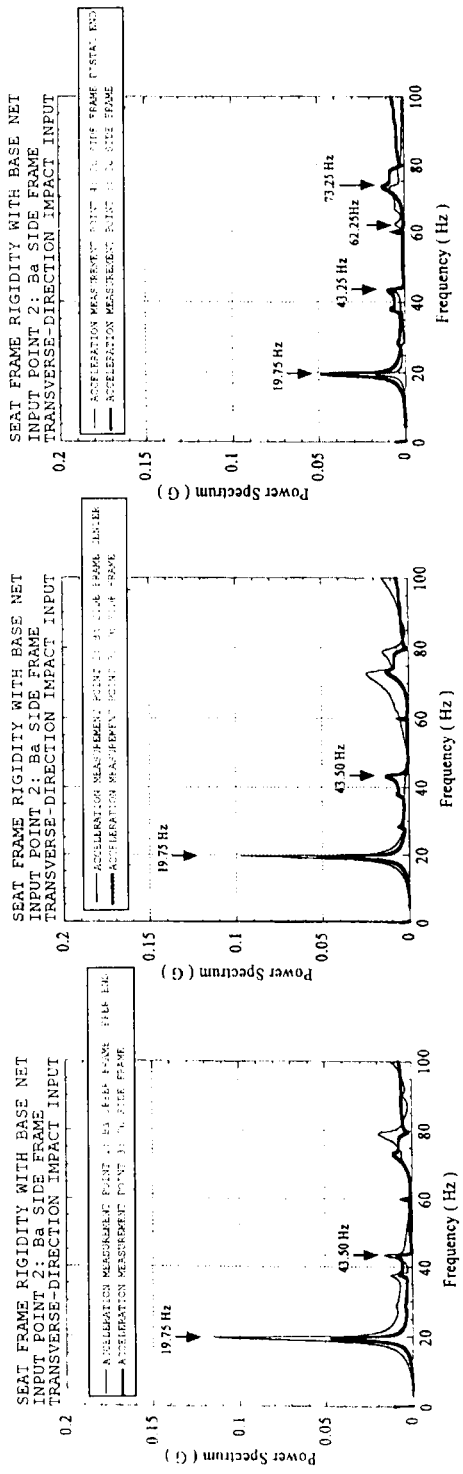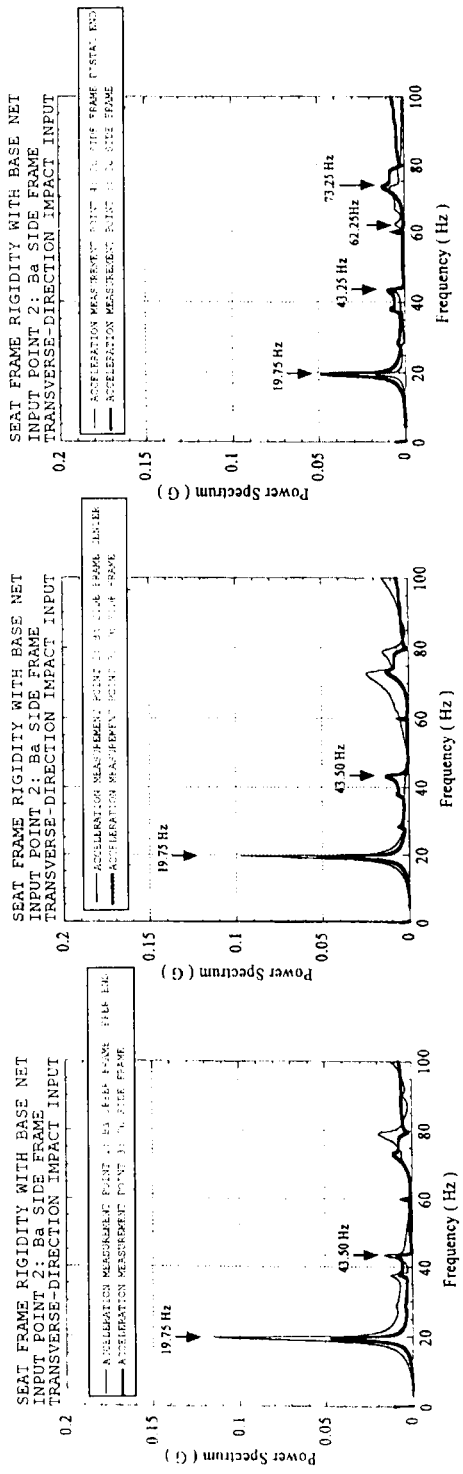

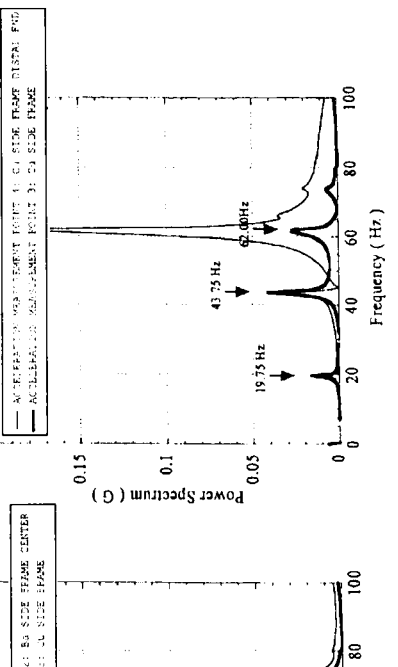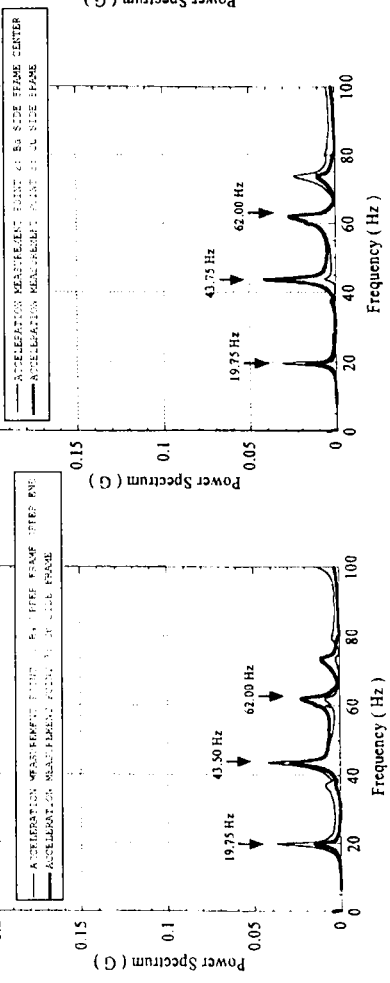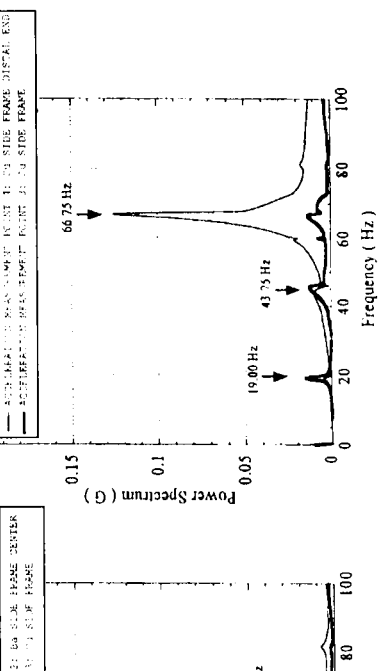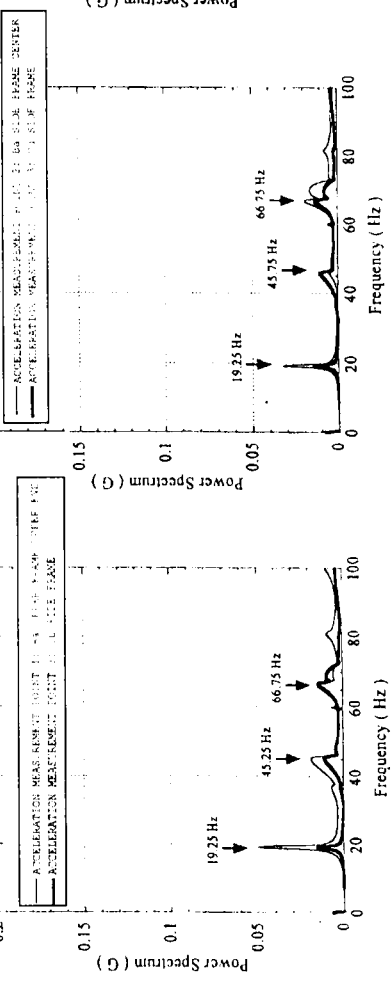

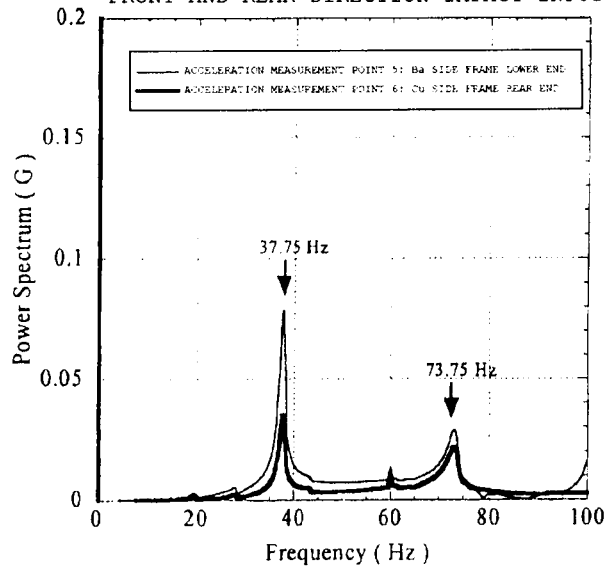
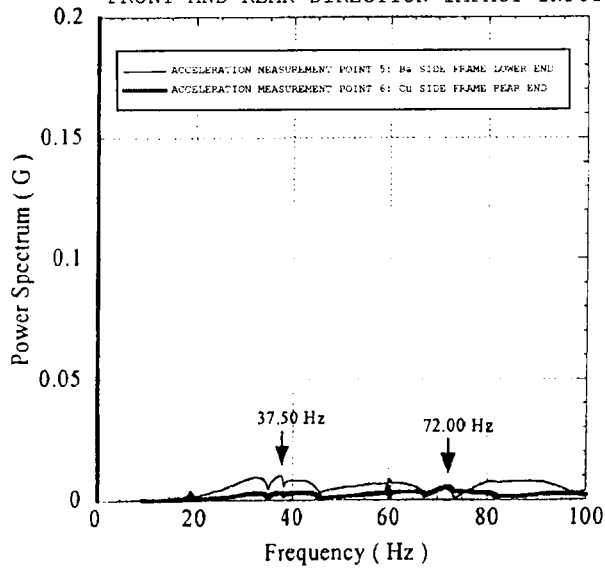

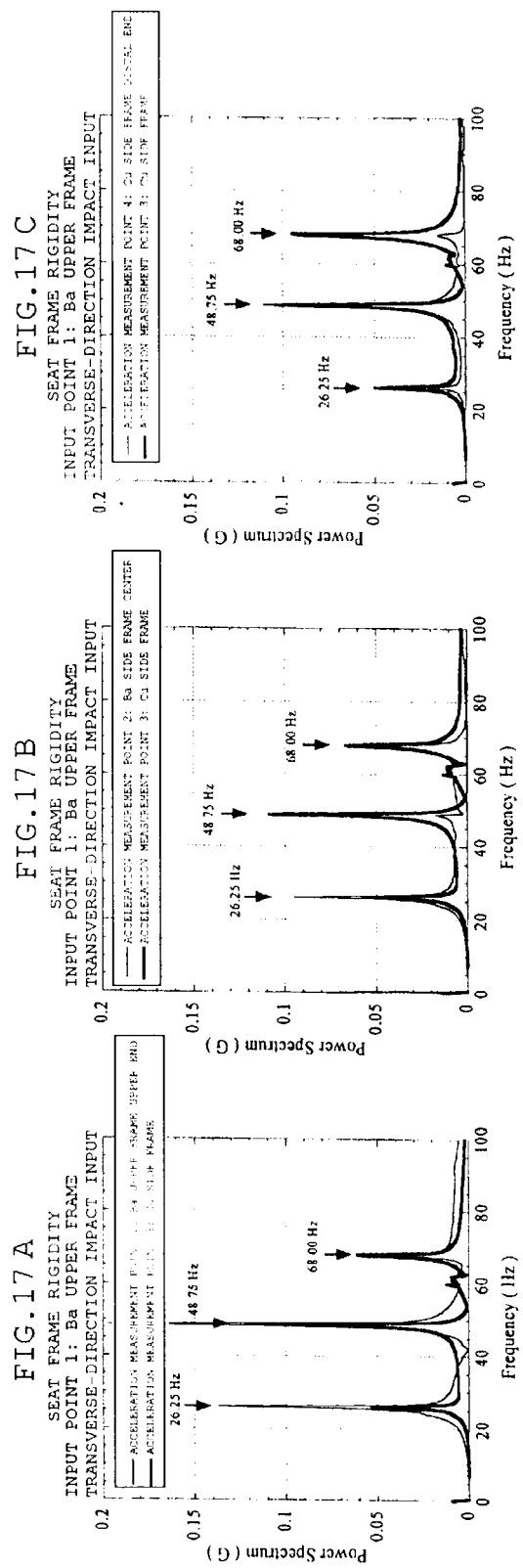

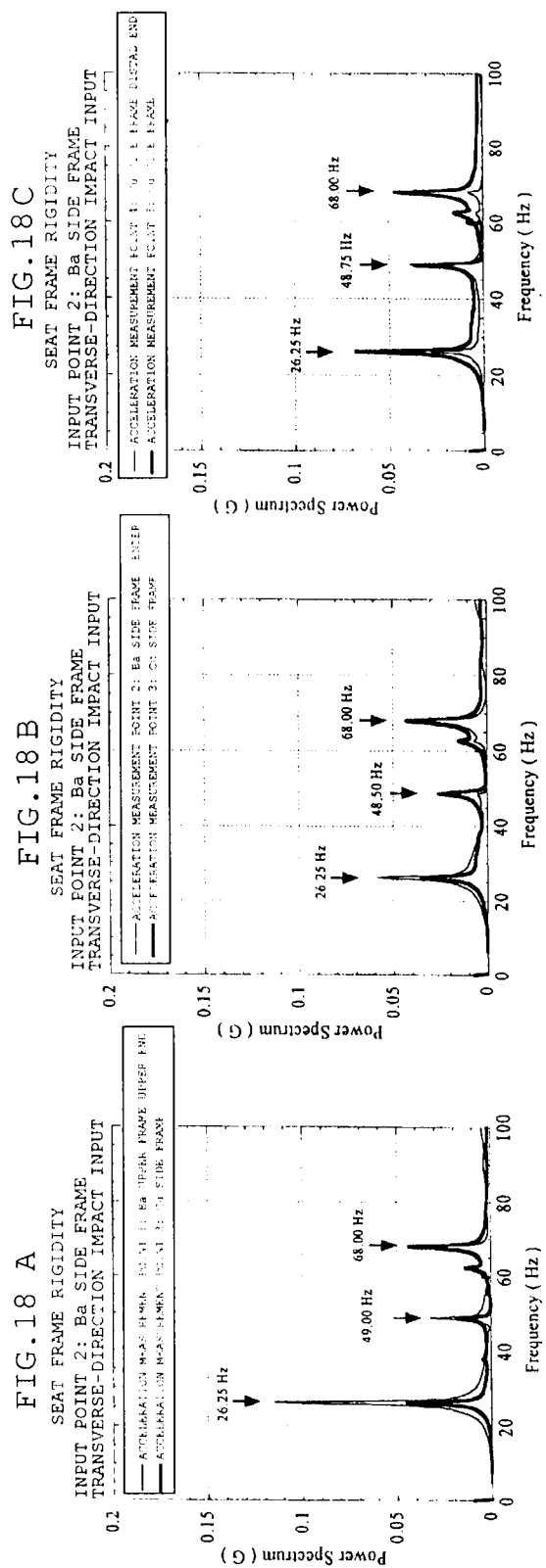

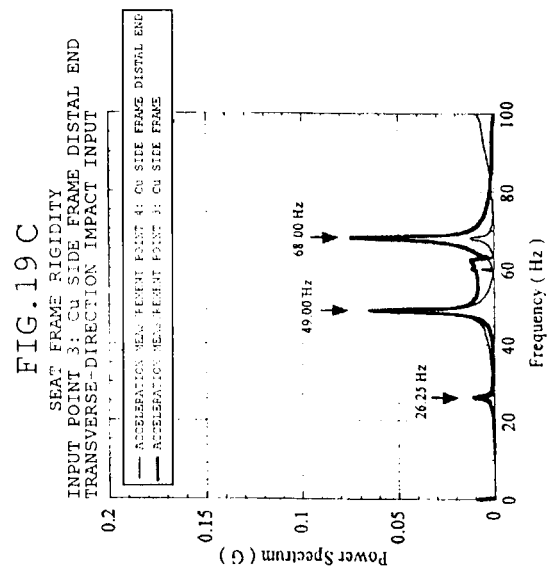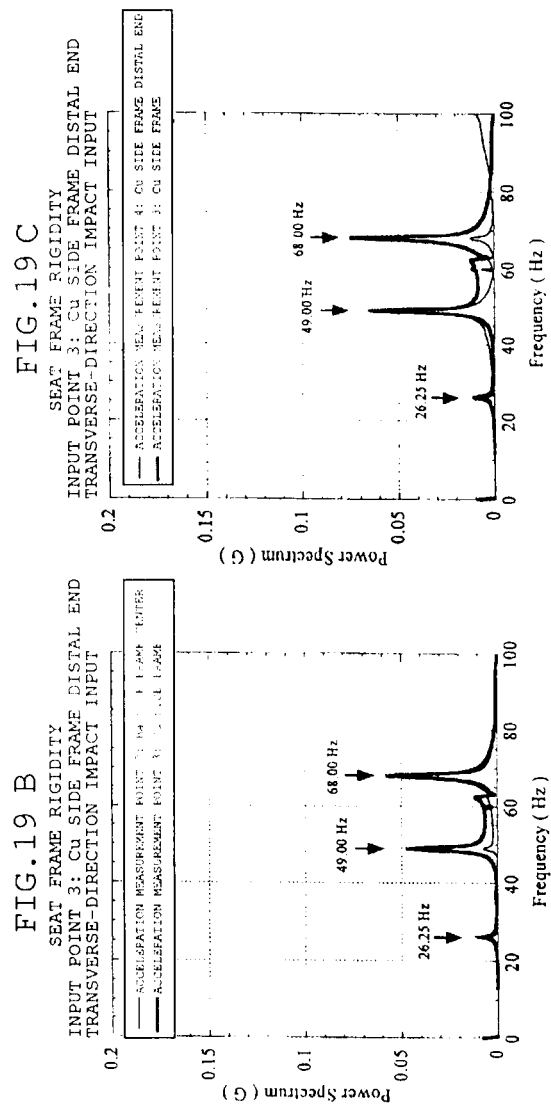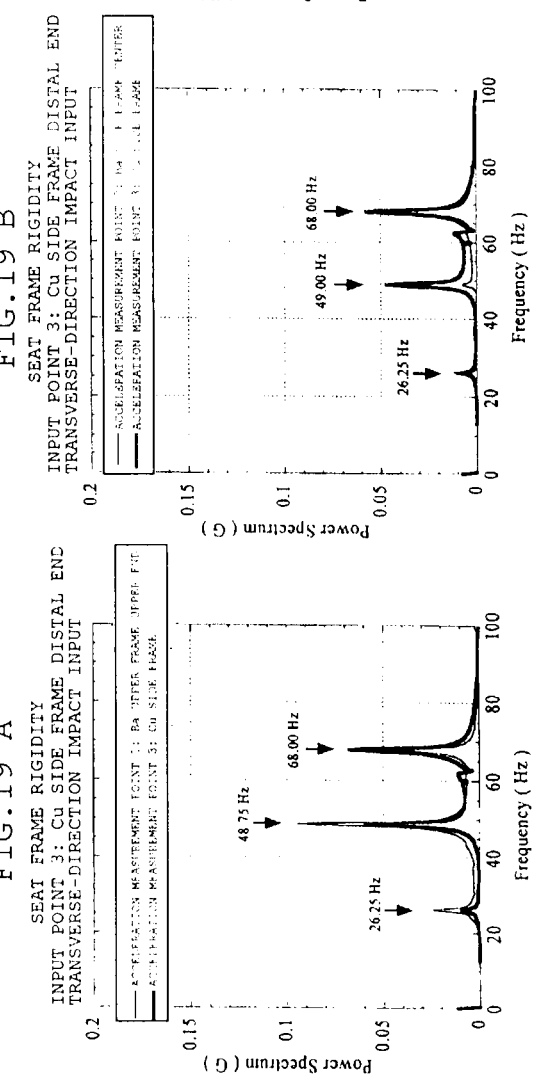

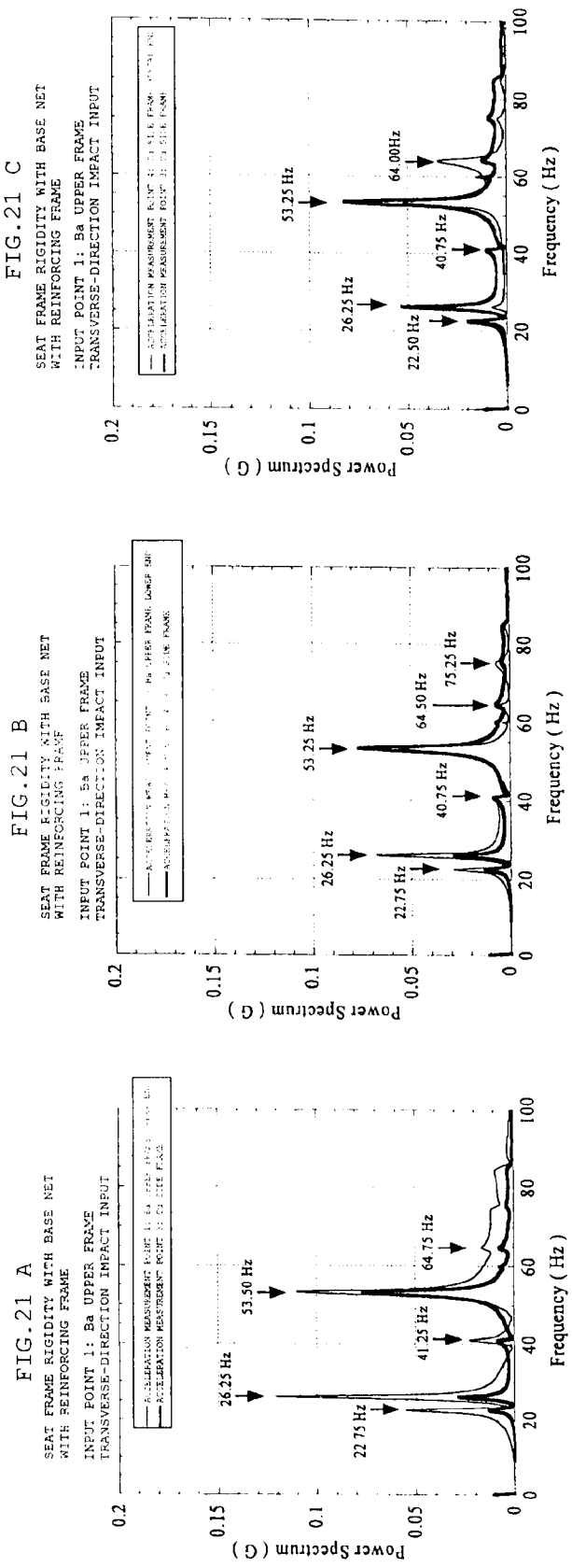

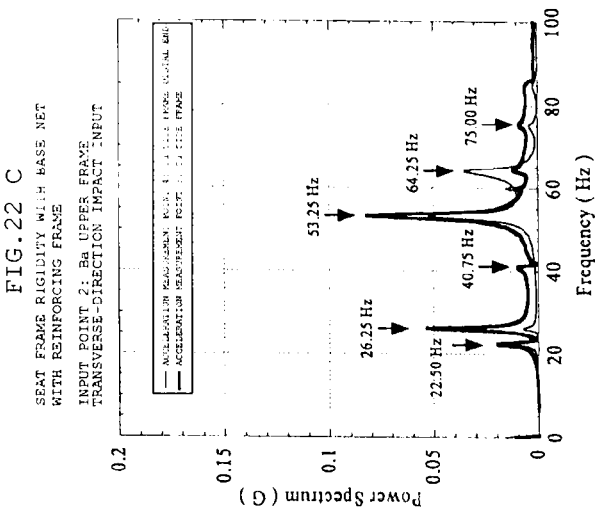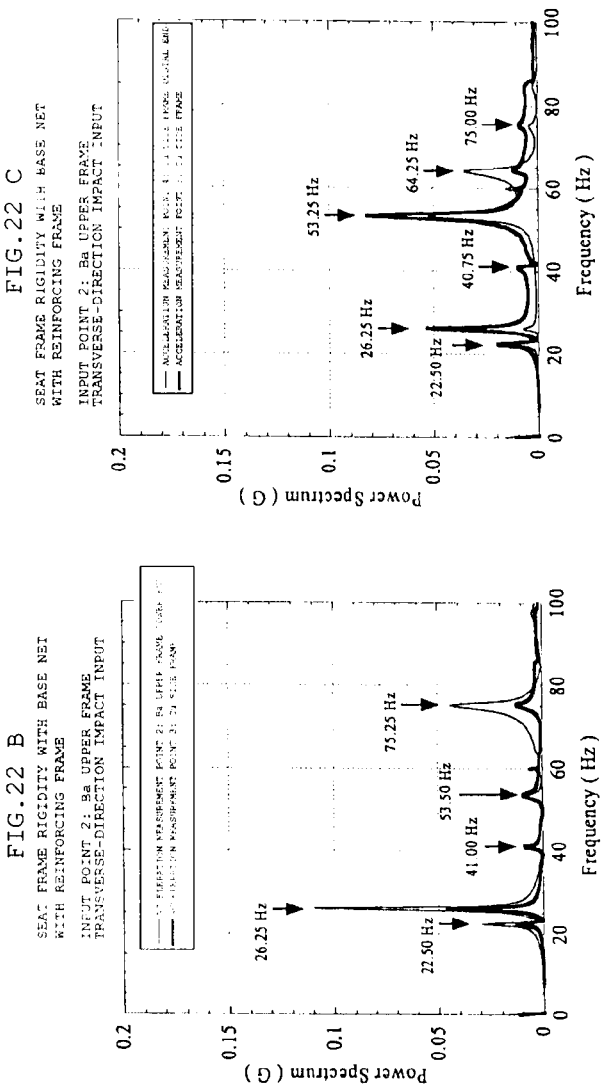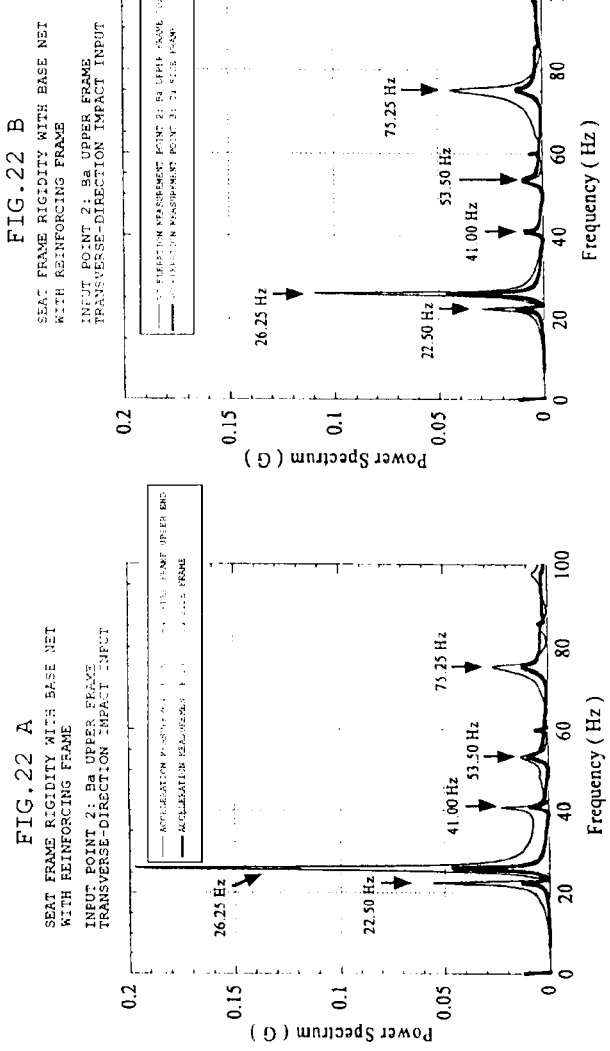

VEHICLE SEAT

TECHNICAL FIELD

The present invention relates to a vehicle seat for an automobile, an aircraft, a train and the like.

BACKGROUND ART

The present applicant has proposed various vehicle seats using a tension structure formed by extending a three-dimensional knit and the like on a back frame and a cushion frame as a cushion material. Among them, Patent Literature 1 discloses a structure in which, if a force is applied in a direction to push in the tension structure extended on the back frame by a rear collision, a side frame collapses inward and moreover, bends rearward so as to receive a human body and to suppress a rebound. Moreover, the back frame of Patent Literature 1 has a configuration in which a frame for a head rest whose upper end position somewhat protrudes forward and forms a forward tilting posture is integrally provided. As a result, the side frame of the back frame bends rearward and suppresses a rebound of the human body while rearward inclination of the head part can be suppressed, and thus, a high whiplash reduction effect can be obtained. According to this back frame, since the whiplash reduction effect is high, there is no need to provide an active head rest mechanism, which contributes to weight reduction of the seat.

Moreover, Patent Literature 2 discloses a technology in which a portion with increased strength by heat treatment is partially provided on a frame so that the frame is deformed rearward from the portion having relatively low strength not subjected to heat treatment when an impact larger than a predetermined level is applied.

PRIOR ART LITERATURES

Patent Literature

Patent Document 1: Japanese Unexamined Patent Application Publication No. 2003-182427
Patent Document 2: WO2006/022186A1

SUMMARY OF INVENTION

Technical Problem

The technologies in Patent Literatures 1 and 2 are both intended to absorb vibration/impact energy by intentionally setting a portion with relatively low strength (deformation allowing portion) which becomes a start point of deformation at a predetermined position in a back frame or a cushion frame. In the case of Patent Literature 1, a portion whose section modulus is lower than the other portions is set as a deformation allowing portion, but if the section modulus is lowered, it causes a problem that the entire rigidity of the back frame is also lowered. There is no problem of lowered rigidity with Patent Literature 2 in which the deformation allowing portion is set by partially applying heat treatment. However, improvement of absorbability of the impact energy and absorbability of vibration energy when an impact larger than a predetermined level is applied in the front-and-rear direction, has always been in demand.

The present invention was made in view of the above circumstances and has an object to provide a vehicle seat having more excellent absorbing performances of vibration/impact energy than before.

Solution to Problem

In order to solve the above problems, a vehicle seat of the present invention is a vehicle seat in which a seat back portion provided with a tension structure extended on a back frame and a seat cushion portion provided with a tension structure extended on a cushion frame are connected through a reclining mechanism, characterized in that a natural frequency in the right-and-left direction of the back frame is lower than the natural frequency in the front-and-rear direction of the back frame.

If the back frame and the cushion frame are formed by using an iron material, the natural frequency in the right-and-left direction of the back frame is preferably 30 Hz or less. In this case, the natural frequency in the right-and-left direction of the back frame is more preferably 13 to 27 Hz.

If the back frame and the cushion frame are formed by using a carbon material, the natural frequency in the right-and-left direction of the back frame is preferably 40 Hz or less. In this case, the natural frequency in the right-and-left direction of the back frame is more preferably 20 to 40 Hz.

Moreover, the back frame is preferably configured such that rigidity in the vicinity of an upper part thereof is lower than the rigidity in the vicinity of a lower part connected to the reclining mechanism, and the cushion frame is preferably configured such that the rigidity in the vicinity of a front portion thereof is lower than the rigidity in the vicinity of a rear portion connected to the reclining mechanism.

Each side frame of the back frame is formed so as to have a substantially rectangular closed sectional shape by oppositely arranging an inner frame and an outer frame, each having predetermined width and length, and provided such that the longitudinal direction thereof is directed substantially along the front-and-rear direction of the back frame. Moreover, it is preferable that the inner frame and the outer frame constituting each side frame of the back frame have peripheral edges fixed and integrated by hemming and the upper end opened.

A first pipe frame which protrudes upward through an upper end opening of each side frame of the back frame and provided between front sides of side frames and a second pipe frame provided between back sides are preferably provided. It is further preferable that the first pipe frame is provided with a portion extending upward from the upper end opening of each side frame and a substantially horizontal portion which connects the portions extending upward, the second pipe frame is provided with a portion extending upward from the upper end opening of each side frame and a substantially U-shaped head rest portion formed protruding further upward from this upward extending portion, and an intersection portion where the substantially horizontal portion of the first frame and the head rest portion of the second pipe frame cross is connected and also, a forward tilting posture is formed so that the upper end position of the head rest portion protrudes more forward. Moreover, an intersection portion where the substantially horizontal portion of the first frame and the head rest portion of the second pipe frame cross is connected through an elastic member.

A reinforcing cross member formed by welding each end portion to each side frame is preferably provided between the lower portions of a pair of side frames constituting the back frame.

Moreover, it is preferably configured such that the inner frame and the outer frame of each side frame of the back frame are joined by welding, and a deformation allowing portion when an impact larger than a predetermined level is applied is set by the welding range or a position of a heat treatment range to be applied to the inner frame or the outer frame.

Moreover, each side frame constituting the cushion frame is preferably formed by oppositely arranging an inner frame and an outer frame, each having predetermined width and length, and by fixing the peripheral edges of the inner frame and the outer frame over the whole periphery by hemming. It is preferably configured such that the inner frame and the outer frame of each side frame of the cushion frame are joined by welding, and a deformation allowing portion when an impact larger than a predetermined level is applied is set by the welding range or a position of a heat treatment range to be applied to the inner frame or the outer frame.

It is preferably configured such that the natural frequency of the back frame or the cushion frame is adjusted to a desired value by a heat treatment condition to be applied to the back frame or the cushion frame.

It is preferably configured such that a belt anchor member provided with an anchor nut penetrating the inner frame and the outer frame constituting each side frame of the cushion frame is provided, a partition wall is provided between opposing faces of the inner frame and the outer frame by sandwiching the anchor nut, and a position adjacent to the belt anchor member is set as a deformation allowing portion when an impact larger than a predetermined level is applied.

It is preferable that a torsion bar arranged in the right-and-left direction is provided in the vicinity of a front edge of the cushion frame, a pair of arm members protruding in a direction substantially orthogonal to this torsion bar are provided with a predetermined interval, a support frame is extended between the arm members, and a cushion material is supported between the support frame and a rear edge side of the cushion frame.

Moreover, it is preferable that a torsion bar arranged in the right-and-left direction is provided in the vicinity of a rear edge of the cushion frame, a pair of arm members protruding in a direction substantially orthogonal to this torsion bar are provided with a predetermined interval, a support frame is extended between the arm members, and the rear edge side of the cushion material is supported by the support frame.

Advantageous Effects of Invention

The vehicle seat of the present invention has a configuration in which a tension structure extended on the back frame is provided, and the natural frequency in the right-and-left direction is set lower than the natural frequency in the front-and-rear direction of the back frame. Since the natural frequency in the right-and-left direction is lower than the natural frequency in the front-and-rear direction, the back frame has a structure that can easily deflect in the right-and-left direction. Therefore, front-and-rear/pitching vibration, or an impact load larger than a predetermined level inputted in the front-and-rear direction due to a rear collision or the like becomes a force to deflect the back frame in the right-and-left direction, whereby the vibration/impact energy is consumed, and moreover, rearward displacement of the back frame also consumes the vibration/impact energy. Therefore, absorbability of the vibration/impact energy is higher than before.

Moreover, since the deformation allowing portion can be set at an arbitrary position by adjustment of the welding range or the heat treatment range, rearward moment strength can be arbitrarily adjusted without causing deterioration in rigidity as compared with the setting of the deformation allowing portion by changing the section modulus.

BRIEF DESCRIPTION OF DRAWINGS

FIG. 13 are frequency analysis results at each measurement point where an impact is inputted in the right-and-left direction from an input point 1, in which FIGS. 13A to 13C are results of measurement by extending the cushion material illustrated in FIG. 10, and FIGS. 13D to 13F are results of measurement by removing the cushion material.

FIG. 14 are frequency analysis results at each measurement point where an impact is inputted in the right-and-left direction from an input point 2, in which FIGS. 14A to 14C are results of measurement by extending the cushion material illustrated in FIG. 10, and FIGS. 14D to 14F are results of measurement by removing the cushion material.

FIG. 15 are frequency analysis results at each measurement point where an impact is inputted in the right-and-left direction from an input point 3, in which FIGS. 15A to 15C are results of measurement by extending the cushion material illustrated in FIG. 10, and FIGS. 15D to 15F are results of measurement by removing the cushion material.

FIG. 16 are frequency analysis results at each measurement point where an impact is inputted in the front-and-rear direction from an input point 4, in which FIG. 16A is a result of measurement by extending the cushion material illustrated in FIG. 10, and FIG. 16B is a result of measurement by removing the cushion material.

FIGS. 17A to 17C are frequency analysis results at each measurement point where an impact is inputted in the right-and-left direction from the input point 1 in a vehicle seat using a seat pad made of a urethane material (Comparative Example 1).

FIGS. 18A to 18C are frequency analysis results at each measurement point where an impact is inputted in the rightand-left direction from the input point 2 in a vehicle seat using a seat pad made of a urethane material (Comparative Example 1).

FIGS. 19A to 19C are frequency analysis results at each measurement point where an impact is inputted in the right-and-left direction from the input point 3 in a vehicle seat using a seat pad made of a urethane material (Comparative Example 1).

FIGS. 21A to 21C are frequency analysis results at each measurement point where an impact is inputted in the right-and-left direction from the input point 1 if a reinforcing frame is extended between the vicinities close to rear edges of side frames of the cushion frame so as to further raise rigidity (Comparative Example 2).

FIGS. 22A to 22C are frequency analysis results at each measurement point where an impact is inputted in the right-and-left direction from the input point 2 if a reinforcing frame is extended between the vicinities close to rear edges of side frames of the cushion frame so as to further raise rigidity (Comparative Example 2).

DESCRIPTION OF EMBODIMENTS

Figure 1:
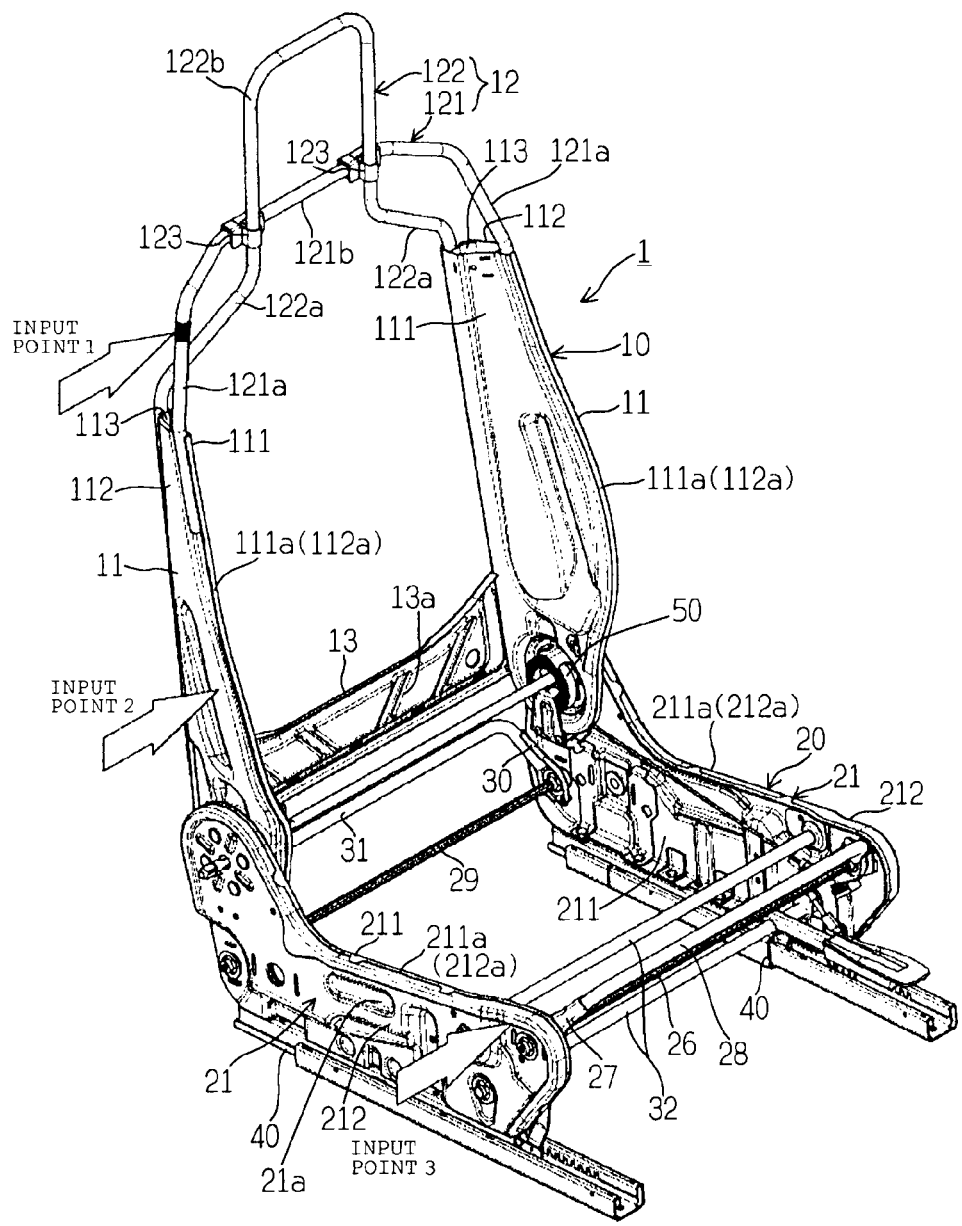
FIG. 1 is a perspective view illustrating a frame structure forming a vehicle seat according to an embodiment of the present invention.
Figure 2:
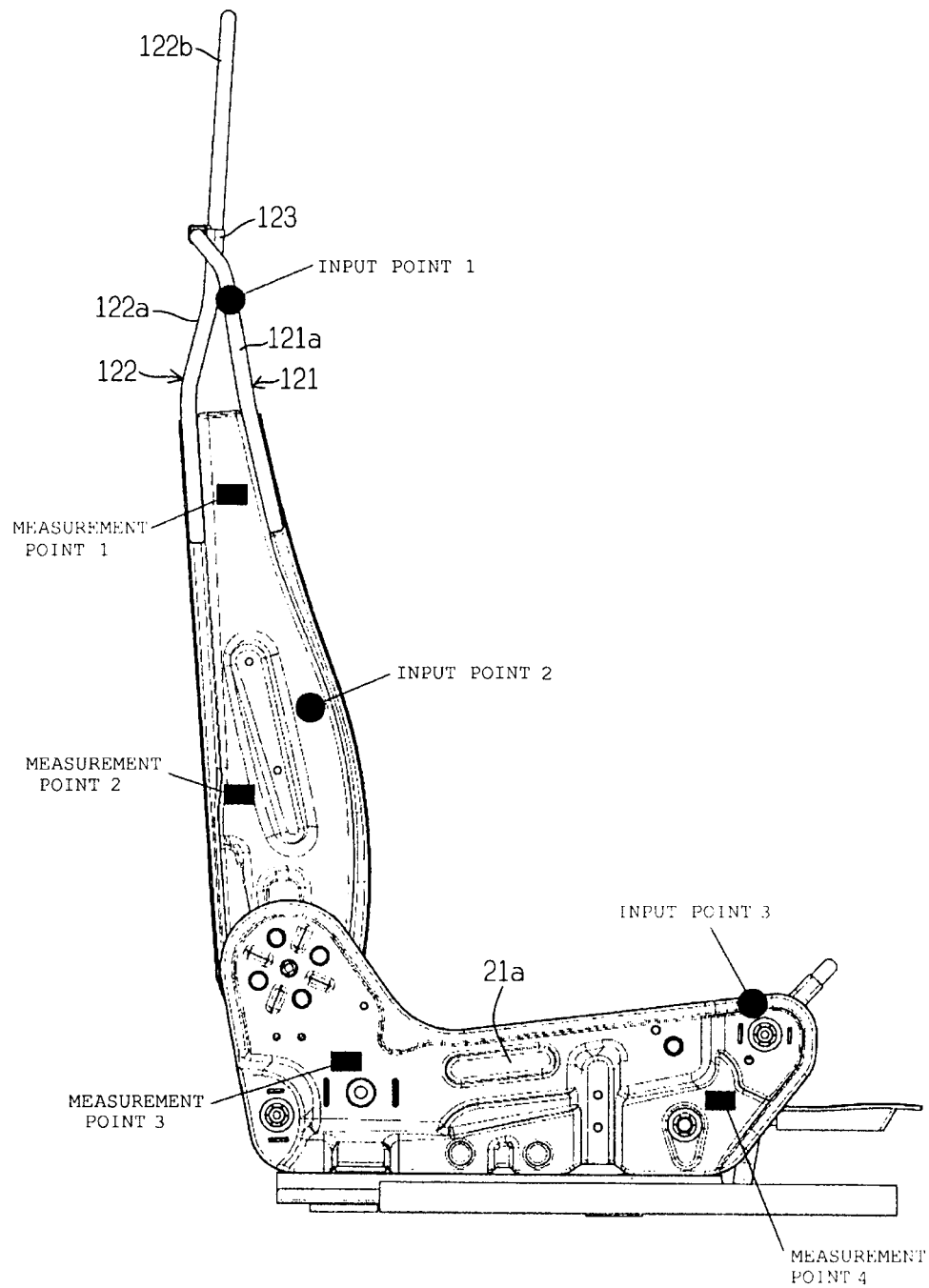
FIG. 2 is a side view of the vehicle seat in FIG. 1.
Figure 3:
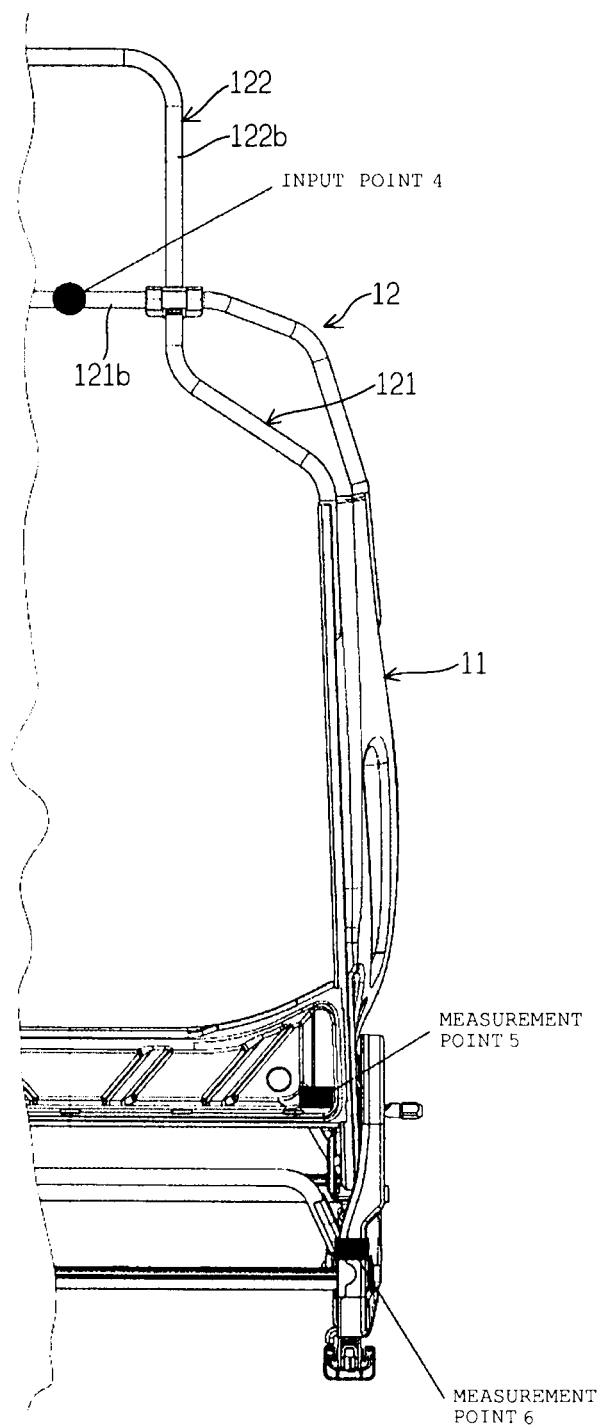
FIG. 3 is a diagram illustrating a part of the front view of the vehicle seat in FIG. 1 and a diagram illustrating positions of a part of input points and measurement points in a test example.
Figure 4:
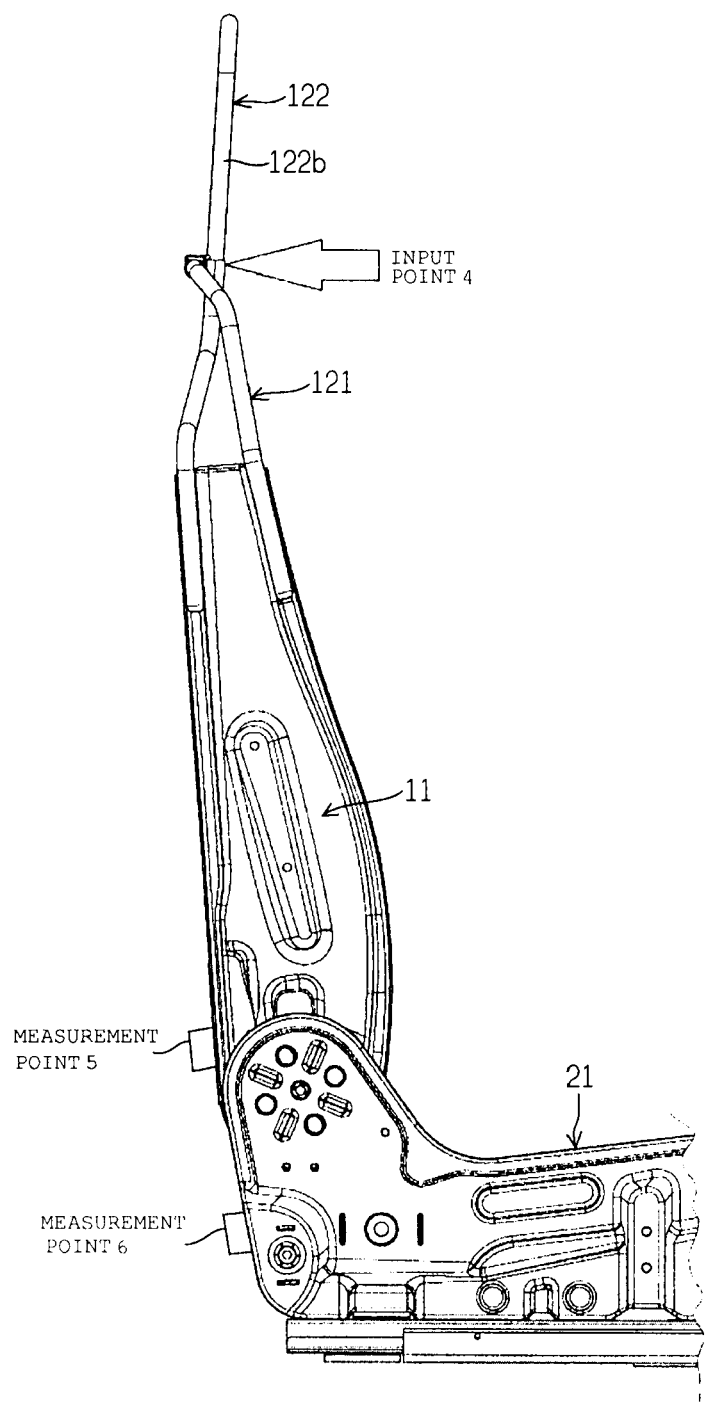
FIG. 4 is a diagram illustrating a part of the side view of the vehicle seat in FIG. 1 and a diagram illustrating positions of a part of input points and measurement points in a test example.

The present invention will be described in more detail below on the basis of an embodiment of the present invention illustrated in the attached drawings. FIG. 1 is a perspective view illustrating a frame structure which forms a vehicle seat 1 according to an embodiment of the present invention, and FIG. 2 is a side view thereof. As illustrated in these figures, the frame structure of the vehicle seat 1 includes a back frame 10 forming a seat back portion and a cushion frame 20 forming a seat cushion portion.

The back frame 10 includes two side frames 11 and a pipe frame 12 as illustrated in FIG. 1. The side frames 11 are disposed in the width direction of the vehicle seat 1 with a predetermined interval and provided capable of tilting with respect to the cushion frame 20 by a reclining mechanism 50. Each side frame 11 of the back frame 10 has, as illustrated in FIG. 1, an inner frame 111 and an outer frame 112, each having a substantially U-shaped shallow section, opposed to each other, and flanges 111a and 112a on a peripheral edge are overlapped and the flange 111a of the inner frame 111 is subjected to hemming so as to embrace the flange 112a of the outer frame 112. However, the flanges 111a and 112a are provided on a portion excluding an upper end edge as illustrated in FIG. 1, and a gap (an upper end opening 113) is formed between the upper end edges of the inner frame 111 and the outer frame 112.

Each side frame 11 is disposed so that the width directions of the inner frame 111 and the outer frame 112 substantially follow the front-and-rear direction (depth direction) of the vehicle seat 1. That is, each side frame 11 is formed so that the inner frame 111 and the outer frame 112, each having predetermined width and length, are oppositely arranged so as to have a substantially rectangular closed sectional shape and is provided so that the longitudinal direction thereof substantially follows the front-and-rear direction of the back frame 10. The flanges 111a and 112a joined by hemming are folded outward. A substantially U-shaped engagement plate provided on each side edge of the cushion material is engaged with each of the flanges 111a and 112a located on the front side. As a result, the cushion material is extended between the side frames 11 of the back frame 10 and becomes a tension structure. A two-dimensional net, a three-dimensional solid knitted fabric, a bead foaming material covered by an elastic covering material or arbitrary combination of them can be used for the cushion material. Those containing three-dimensional solid knitted fabric excellent in cushioning properties, even though the thickness is small, are preferable.

The pipe frame 12 is composed of a first pipe frame 121 and a second pipe frame 122 as illustrated in FIGS. 1 and 2. Both protrude upward through the open surface on the upper end of each side frame 11 (upper end opening 113), in which the first pipe frame 121 is provided between the front sides of the side frames 11, while the second pipe frame 122 is provided between the depth sides of the side frames 11. Lower end portions overlapping each side frame 11 of the first pipe frame 121 and the second pipe frame 122 are fixed to each side frame 11 by welding or caulking. The first pipe frame 121 is formed as a substantial U-shape provided with a portion 121a extended upward from the upper end opening 113 of each side frame 11 and a substantially horizontal portion 121b connecting the upward extending portions 121a to each other. The second pipe frame 122 includes a portion 122a inclined diagonally so as to be drawn to the center direction from the upper end opening 113 of each side frame 11 and a head rest portion 122b formed a substantial U-shape so as to protrude upward from this inclined portion 122a. The head rest portion 122b crosses the substantially horizontal portion 121b of the first frame 121, and the crossing portion is connected by using a connecting fitting 123. An elastic member such as rubber is preferably interposed between the connecting fitting 123 and the head rest portion 122b. As a result, a relative motion between the first pipe frame 121 and the second pipe frame 122 and deflection of the back frame 10 itself can occur easily, which contributes to reduction of the natural frequency and can improve vibration absorbability as well as impact absorbability. Moreover, that can help handle a noise generated in the relative motion between the first pipe frame 121 and the second pipe frame 122. Furthermore, the head rest portion 122b is formed a somewhat forward tilting posture so as to protrude forward more largely at the upper end position when seen from the side face as illustrated in FIG. 2. As a result, when each side frame 11 is displaced rearward by receiving an impact larger than a predetermined level, as will be described later, rearward tilting of the head part is suppressed, and whiplash can be reduced.

A reinforcing cross member 13 whose each end is welded to each side frame 11 is provided between the lower parts of the pair of side frames 11 of the back frame 10. Moreover, the reinforcing cross member 13 is provided on the back side in the width direction of the side frames 11. As a result, if the cushion material, which is a tension structure, is pressed rearward, the front sides in the width direction of the side frames 11 collapse inward, while the back side keeps the distance between the side frames 11 as much as possible. That is, this reinforcing cross member 13 contributes to improvement of rigidity in the right-and-left direction of the back frame 10. In order to further improve the rigidity, a bead 13a may be partially formed as illustrated in FIG. 1. Alternatively, heat treatment may be applied partially.

As described above, though each side frame 11 constituting the back frame 10 uses two thin plates, which are the inner frame 111 and the outer frame 112, the both are subjected to hemming and integrated, and thus, predetermined rigidity and light weight are maintained. Moreover, each side frame 11 is formed so that the inner frame ill and the outer frame 112, each having predetermined width and length, are oppositely arranged so as to form a substantially rectangular closed sectional shape and they are provided so that the longitudinal direction thereof follows the front-and-rear direction of the back frame 10. That is, the side frame 11 can ensure predetermined rigidity because of its closed sectional shape, and at the same time the front-and-rear direction of the substantially rectangular closed sectional shape substantially follows the front-and-rear direction of the back frame 10. Thus, the side frame 11 has a sectional modulus in the right-and-left direction relatively smaller than that in the front-and-rear direction. As a result, the back frame 10 of this embodiment has predetermined rigidity though it is light-weighted, while the back frame 10 is configured such that the natural frequency in the right-and-left direction is lower than the natural frequency in the front-and-rear direction. Moreover, in this embodiment, the two pipe frames 121 and 122 are joined only at the intersections where they cross to the side frame 11, while the other portions are left apart. Thus, the two pipe frames 121 and 122 have a structure that can easily move in the right-and-left direction. This point also contributes to lowering of the natural frequency in the right-and-left direction than the natural frequency in the front-and-rear direction.

The natural frequency in the right-and-left direction of the back frame 10 is preferably set at 30 Hz or less, more preferably set within a range of 13 to 27 Hz or far more preferably set within a range of 15 to 20 Hz by adjusting the strength and the positions of connecting spots of the pipe frames 121 and 121, the thicknesses and strength of the inner frame 111 and the outer frame 112 forming the side frame 11, the thickness and strength of the reinforcing cross member 13 and the like if the back frame 10 and the cushion frame 20 are constructed by an iron material.

Figure 12:
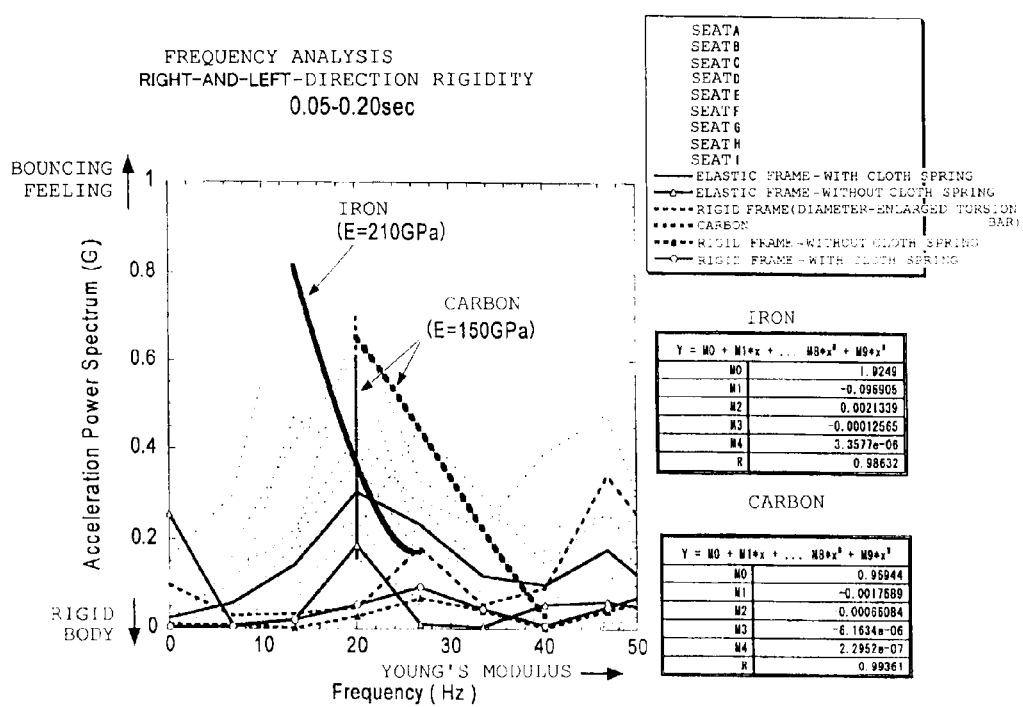
FIG. 12 is a diagram illustrating an experiment result for acquiring a favorable value of a natural frequency in the right-and-left direction of a back frame.

FIG. 12 shows a test result obtained by examining the preferable natural frequency in the right-and-left direction of the back frame 10 of this embodiment. A basic framework of the vehicle seat 1 used in the test is as illustrated in FIGS. 1 to 4, but a plurality of seats in which the positions of the connecting spots of the pipe frames 121 and 122, the thicknesses of the inner frame 111 and the outer frame 112 forming the side frame 11 and the like are adjusted in various ways were manufactured, and a preferable range of the natural frequency was examined by connecting peak positions of the natural frequency of each seat. In FIG. 12, Acceleration Power Spectrum on the vertical axis indicates that the higher the gain is, the more the spring feeling is felt, while the lower the gain is, the closer it becomes to a rigid body.

A range indicated by a bold solid line of 13 to 27 Hz is a preferable range of a seat using an iron material (Young's modulus E=210 GPa), and the balance between the natural frequency and the gain on the vertical axis is preferably set in a range not exceeding the position of this bold solid line. However, if the natural frequency is set to approximately 30 Hz or less, considering a certain allowable range, the rigidity and the spring feeling can be well-balanced. Moreover, since the balance between the rigidity and the spring feeling is more preferable if the gain is set within a range of 0.3 to 0.6, the natural frequency in the right-and-left direction is most preferably set within a range of 15 to 20 Hz. This preferable range of the natural frequency will be described again in test examples, which will be described later.

Moreover, manufacture of the back frame and the cushion frame from a carbon material has been also examined in the same way. A bold broken line in FIG. 12 indicates a preferable range of the natural frequency in the carbon material and the natural frequency is preferably set at approximately 40 Hz or less but the natural frequency is preferably set to a range of 20 to 40 Hz, considering the balance between the rigidity and the bouncing feeling. The side frame 11 may be made having the shape similar to that of the back frame 10 illustrated in FIGS. 1 to 4, in which a carbon material is used for the outer frame 112, while an iron plate is used for the inner frame 111, and the peripheral edge of the inner frame 111 is hemmed on the peripheral edge of the outer frame 112 so as to have the substantially rectangular closed sectional shape similar to the above.

The natural frequency in the front-and-rear direction of the back frame 10 is set higher than the natural frequency in the right-and-left direction since the back frame has a substantially rectangular closed sectional shape as described above.

Figure 6:
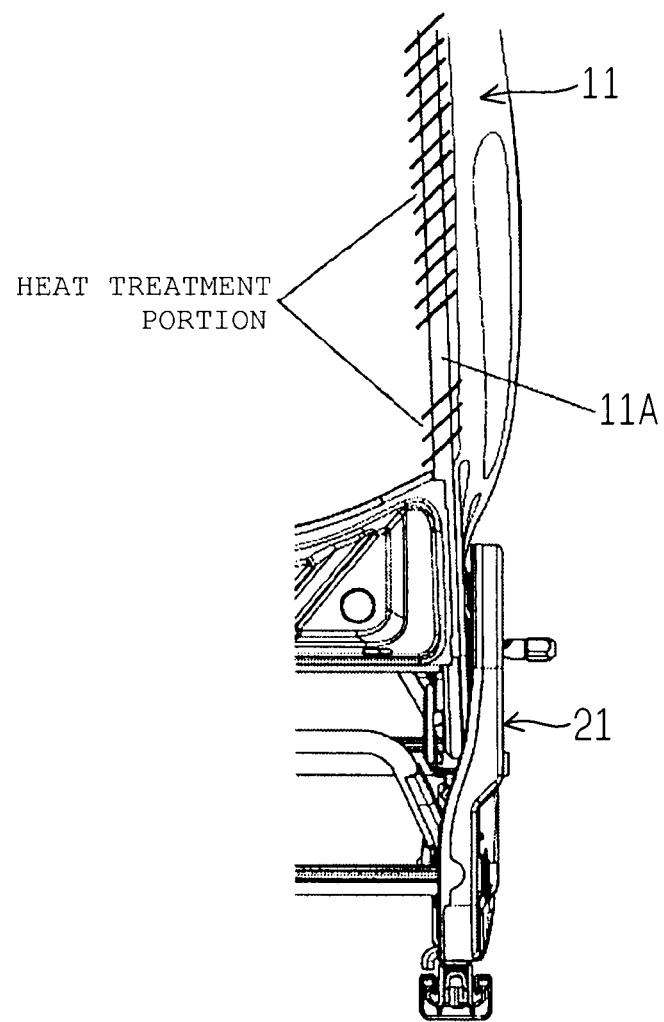
FIG. 6 is a diagram for explaining how to provide a deformation allowing point.

Moreover, a deformation allowing portion 11A is set in each side frame 11 so that the back frame 10 is displaced rearward if an impact larger than a predetermined level is received by a rear collision or the like (See FIG. 6). The lower part of the side frame 11 has high rigidity since it is connected to the reclining mechanism 50, and the deformation allowing portion 11A is formed above the portion connected to the reclining mechanism 50. The deformation allowing portion 11A can be set by adjusting a welded range if the inner frame 11 and the outer frame 112 are joined by welding. That is, a heat treatment or welding is not applied to a portion which will become the deformation allowing portion 11A as illustrated in FIG. 6. If the heat treatment or welding is applied, the strength of that portion is increased, and the portion to which the heat treatment or welding is not applied has relatively lower strength and becomes the deformation allowing portion 11A.

The natural frequency, a deformation mode in an elastic area and the like can be adjusted by arbitrarily adjusting a heat treatment condition both in the back frame 10 and the cushion frame 20, which will be described later. That is, a surface structure of each frame can be formed of a martensite structure, a duplex grain structure or a structure in which island-state martensites are dispersed in the duplex grain structure by adjusting a range to apply the heat treatment or a heating condition or a cooling condition in the heat treatment in various ways. As a result, not only rigidity of each member can be adjusted in various ways but also a composite mechanical characteristic can be provided by setting a high-rigidity portion and a low-rigidity portion in one member. As a result, the natural frequency can be adjusted to the above desired range also by adjusting the heat treatment condition in various ways.

The cushion frame 20 includes two side frames 21, each supported by right and left slide adjusters 40. The side frame 21 is composed of an inner frame 211 and an outer frame 212, each formed a substantially U-shaped shallow section of a thin plate having predetermined width and length similarly to the side frames 11 of the back frame 10.

Figure 8A:
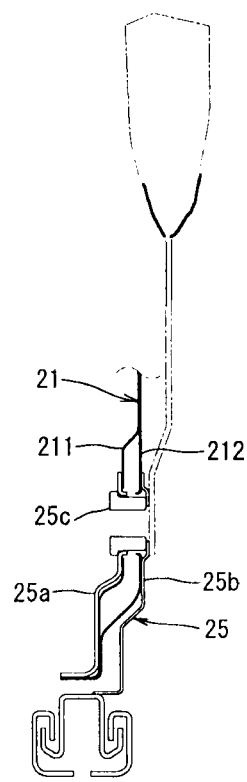
FIG. 8A is a view on arrow A line in FIG. 7
Figure 8B:
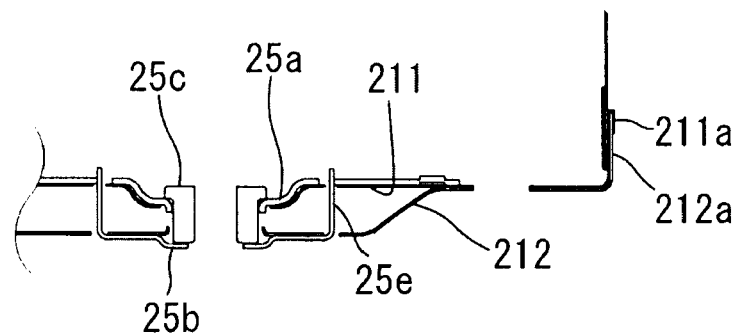
FIG. 8B is a view on arrow B line in FIG. 7.

The inner frame 211 and the outer frame 212 are fixed by overlapping and hemming flanges 211a and 212a so that inner faces thereof are faced with each other (See FIG. 8). Since the inner frame 211 and the outer frame 212 are formed a substantially U-shaped shallow section as described above, a gap is formed between the both by arranging them with the inner faces faced with each other. It is only necessary that this gap is formed at least in a part of the opposing range of the inner frame 211 and the outer frame 212, but a foam molding (bead foam) by a bead method of a resin containing at least one of polystyrene, polypropylene, and polyethylene may be filled. If the bead foam is filled, rigidity can be improved without substantially increasing the weight. It is also possible to fill the bead foam between the inner frame 111 and the outer frame 112 in the side frame 11 of the above-described back frame 10.

In this embodiment, the inner frame 211 and the outer frame 212 of the cushion frame 20 are integrated by hemming on the whole peripheral edges as illustrated in FIG. 1. That is, since the hemmed portion annularly continues, the inner frame 211 and the outer frame 212 do not shift with respect to each other. Therefore, even if a thin plate, which is not suitable for welding or the like, is used as the inner frame 211 and the outer frame 212, the both can be reliably joined, and an iron material having the thickness of 1.0 mm or less or an aluminum having the thickness of 1.6 mm or less can be used, which contributes to weight reduction. As described above, required rigidity can be kept by applying annular hemming even if a thin plate is used. Since rigidity of the cushion frame 20 is high, if an impact larger than a predetermined level is inputted by a rear collision, the cushion frame 20 is largely deformed, that is, buckles too much, and thus, the back frame 10 can be prevented from tilting rearward too much. On the other hand, if rigidity in the right-and-left direction of the cushion frame 20 is too high, displacement in the right-and-left direction of the back frame 10 is suppressed, and impact absorbability is offset. Thus, the natural frequency in the right-and-left direction of the cushion frame is preferably 50 Hz or less or more preferably 45 Hz or less.

Figure 7:
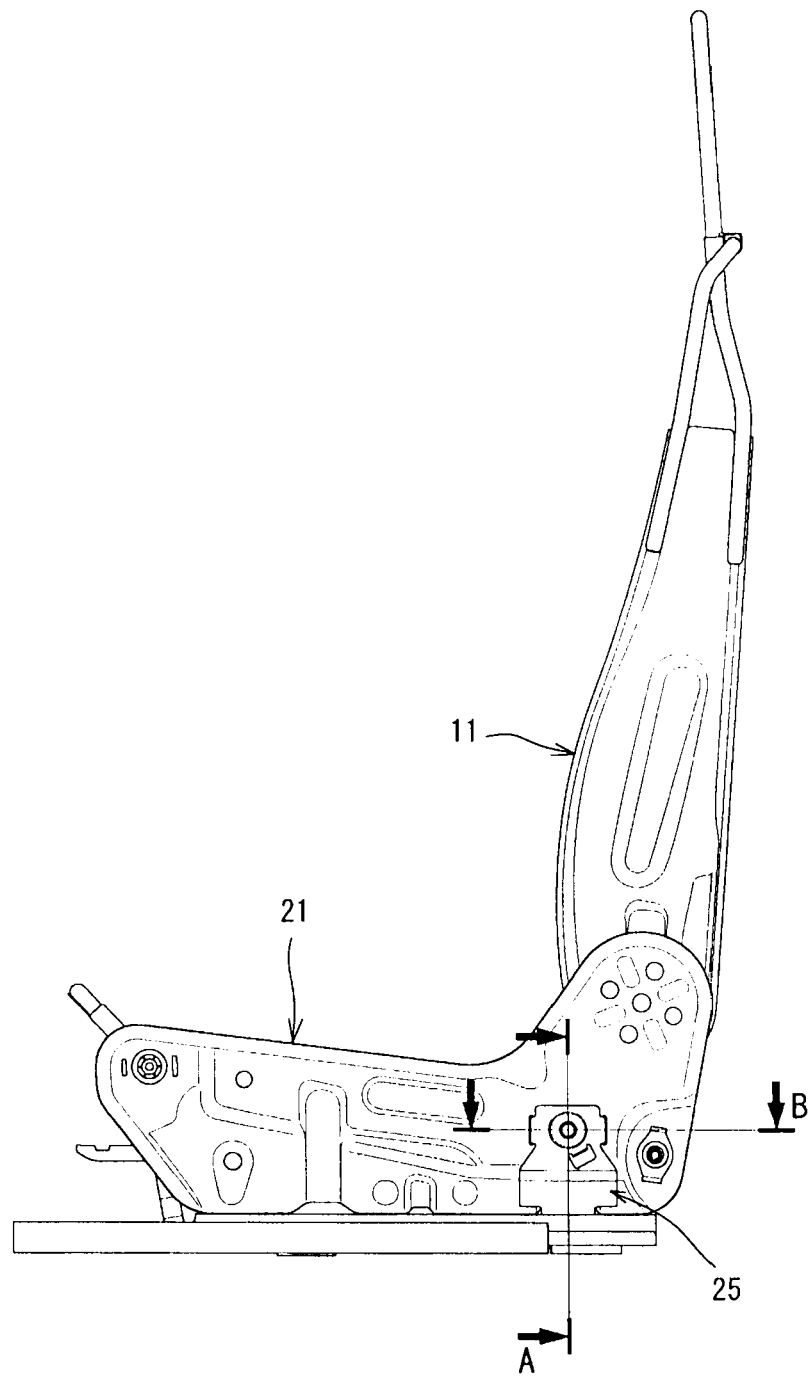
FIG. 7 is a side view of the vehicle seat in FIG. 1 in a state in which a belt anchor member is provided.
Figure 9A:
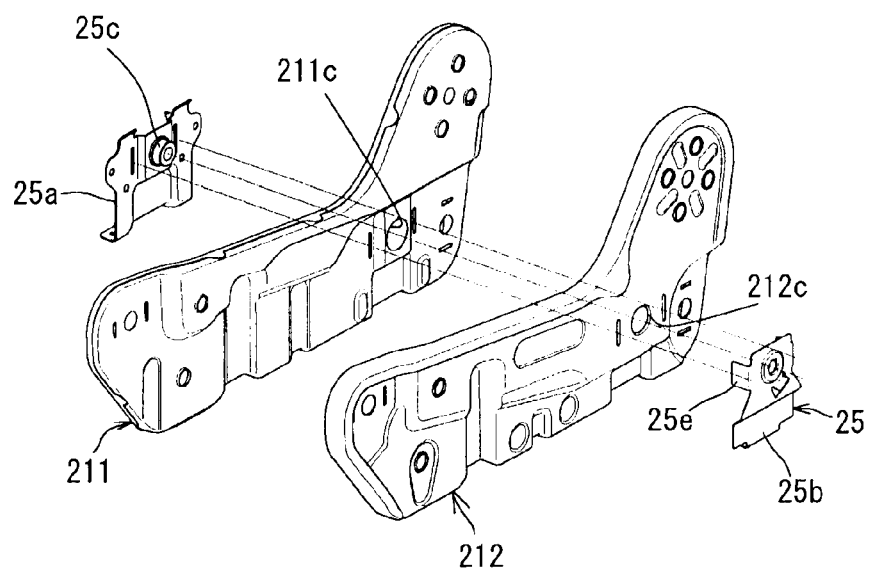
FIG. 9A is an exploded perspective view for explaining how to mount the belt anchor member on a side frame.
Figure 9B:
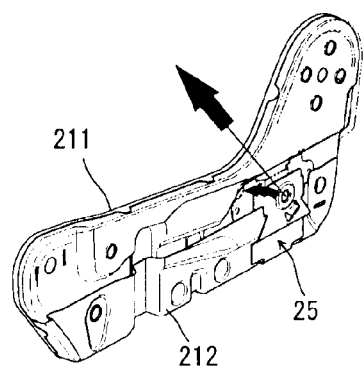
FIG. 9B is a diagram for explaining an action of the belt anchor member.

The belt anchor member 25 is provided in a portion closer to the rear than the center in the front-and-rear direction of the side frame 21 as illustrated in FIGS. 7 to 9. The belt anchor member 25 is provided with a plate-shaped inner belt anchor 25a and an outer belt anchor 25b, and a cylindrical anchor nut 25c is provided on the inner belt anchor 25a. Insertion holes 211c and 212c through which the anchor nut 25c is inserted are formed in the front-and-rear direction closer to the rear than the center of the inner frame 211 and the outer frame 212. Therefore, the inner anchor belt 25a is fixed to the inner face of the inner frame 211, and the anchor nut 25c is inserted in the inner frame 211 through the insertion hole 211c and then, further inserted in the outer frame 212 through the insertion hole 212c and connected and fixed by the outer belt anchor 25b fixed to the outer face of the outer frame 212.

In this embodiment, moreover, partition walls 25e protruding in the direction of the inner belt anchor 25a are provided on the both side portions of the outer belt anchor 25b. The partition walls 25e are inserted into slits provided in the both side portions of the insertion hole 212c of the outer frame 212 and the insertion hole 211c of the inner frame 211 and provided so as to be located around the anchor nut 25c between the opposing surfaces of the inner frame 211 and the outer frame 212. Rigidity of the inner frame 211 and the outer frame 212 in the vicinity of the partition walls 25e can be improved by providing the partition walls 25e. As a result, rigidity of the side frame 21 of a portion where the partition wall 25e is provided can be improved, while rigidity on the front side of the belt anchor member 25 becomes relatively low. Therefore, if the side frame 21 is buckled by receiving an impact larger than a predetermined level, the side frame buckles around the front side of the belt anchor member 25, and a buckling position can be kept substantially at a constant position.

Figure 10:
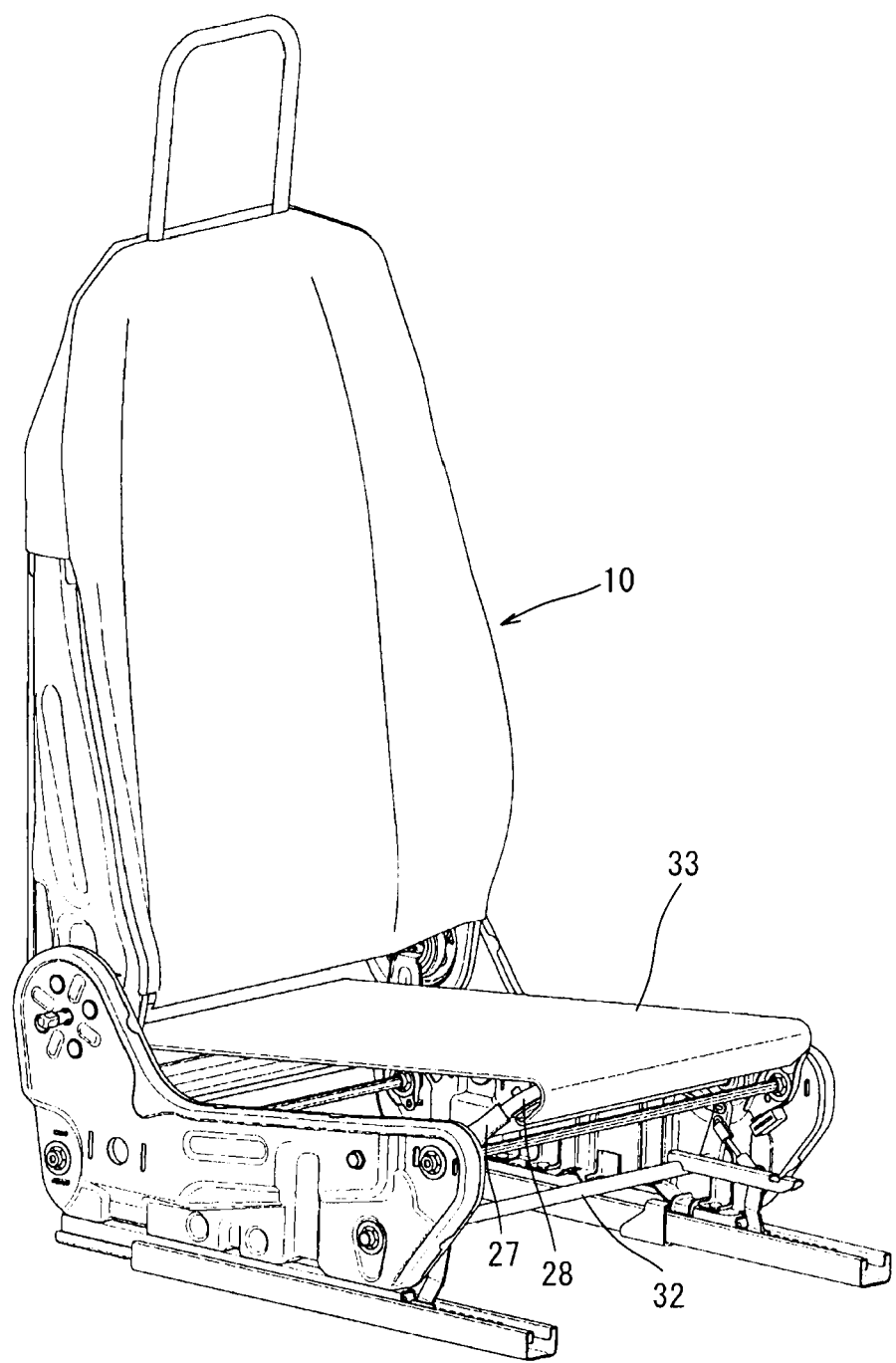
FIG. 10 is a diagram illustrating a state in which a cushion material (base net) is mounted on a cushion frame.

A first torsion bar 26, arm members 27 connected to the vicinities of the both ends of the first torsion bar 26, and a front edge side support frame 28 extended between the pair of arm members 27 are provided in the vicinity of the front edge of each side frame 21. Moreover, a second torsion bar 29, arm members 30 connected to the vicinities of the both ends of the second torsion bar 29, and rear edge side support frame 31 extended between the pair of arm members 30 are provided in the vicinity of the rear edge of each side frame 21. Moreover, a cushion material 33 is extended and elastically supported between the front edge side support frame 28 and the rear edge side support frame 31 (See FIG. 10). Moreover, a stabilizer 32 is provided between the front edges of each side frame 21.

Each side frame 21 has a partial difference in strength by providing a bead portion 21a or by partially applying heat treatment as illustrated in FIG. 1 and the like.

A lower end portion of each side frame 11 of the back frame 10 and a rear end portion of each side frame 21 of the cushion frame 20 are partially overlapped with each other and connected by the reclining mechanism 50. Therefore, rigidity of the lower end portion of the back frame 10 and the rear end portion of the cushion frame 20 is made higher than that of the other portions by the reclining mechanism 50.

Figure 5:
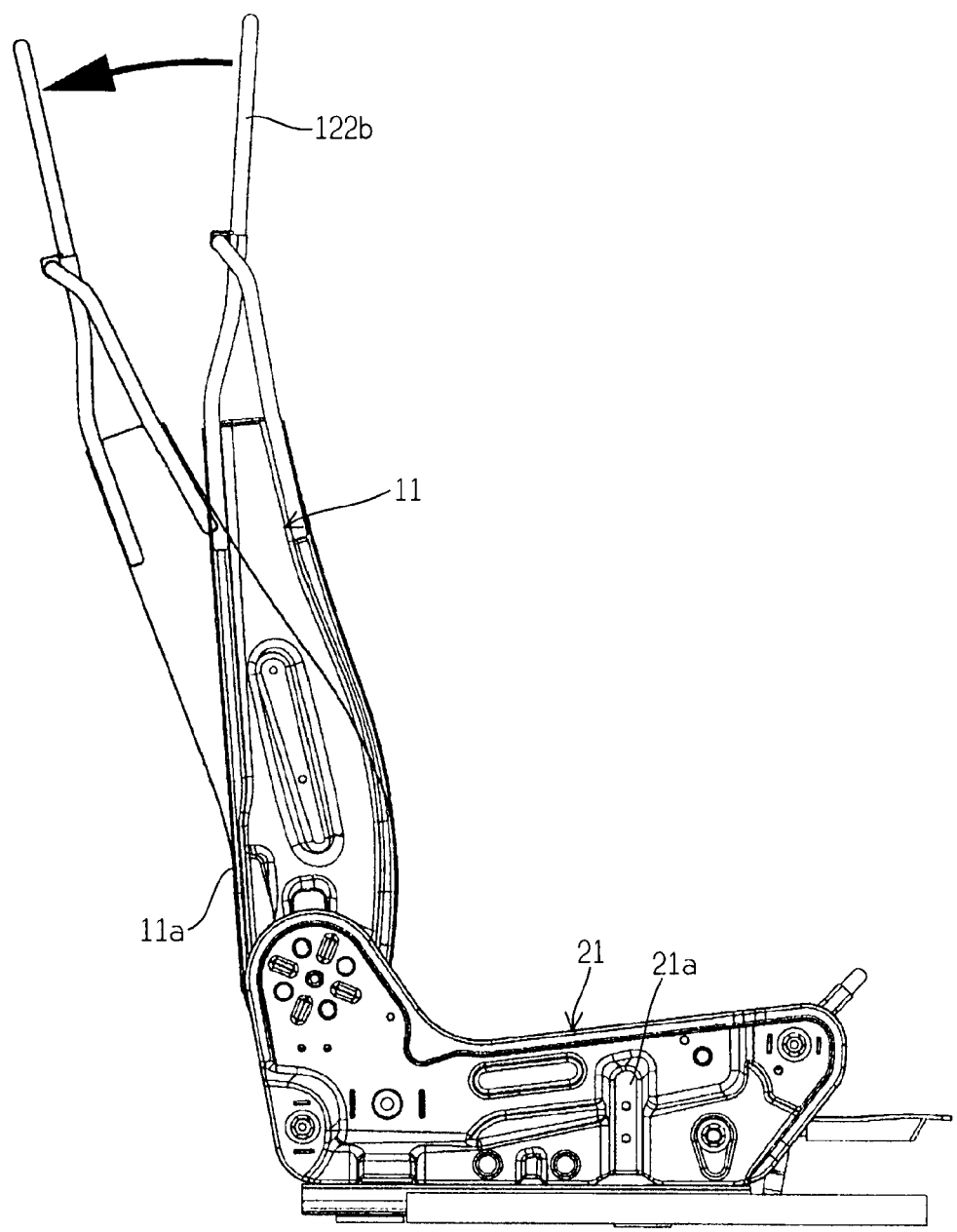
FIG. 5 is a side view for explaining an action of the vehicle seat in FIG. 1.

According to this embodiment, if an impact larger than a predetermined level is applied due to a rear collision, rearward displacement occurs from the deformation allowing portion 11A as illustrated in FIG. 5. At this time, in this embodiment, since the natural frequency in the right-and-left direction of the back frame 10 has a predetermined value lower than the natural frequency in the front-and-rear direction, the back frame easily deflects in the right-and-left direction. Therefore, the force inputted in the front-and-rear direction by the rear collision can be easily converted to a right-and-left motion, while since rigidity in the vicinity of the lower end portion of the back frame 10 is high, the back frame 10 is deformed to move in the rotating direction around the vicinity of this lower end portion. The impact energy is dispersed in that process. Moreover, a human spine easily bends in the front-and-rear direction and is flexible but cannot easily bend in the right-and-left direction and is rigid. Therefore, by setting the rigidity in the front-and-rear direction high (raising the natural frequency) as the back frame 10 and the rigidity in the right-and-left direction low (lowering the natural frequency), the skeleton of a human being and the framework of the vehicle seat 1 (the back frame 10 and the cushion frame 20) are well-balanced, and impact absorbability and vibration absorbability of the vehicle seat 1 are improved. Moreover, peeling of the hemmed portion of the inner frame 111 and the outer frame 112 in the side frame 11 of the back frame 10 occurs, and the impact energy is also consumed by this peeling action, whereby the impact is alleviated.

Moreover, in this embodiment, the head rest portion 122b is formed a somewhat forward tilting posture so as to protrude forward more largely at the upper end position as described above. Therefore, if each side frame 11 is displaced rearward upon receipt of an impact larger than a predetermined level, the energy is absorbed by a behavior proximate to a buckling phenomenon while rearward tilting of the head part is suppressed, and thus, whiplash caused by hitting of the back frame 10 can be reduced.

Figure 11:
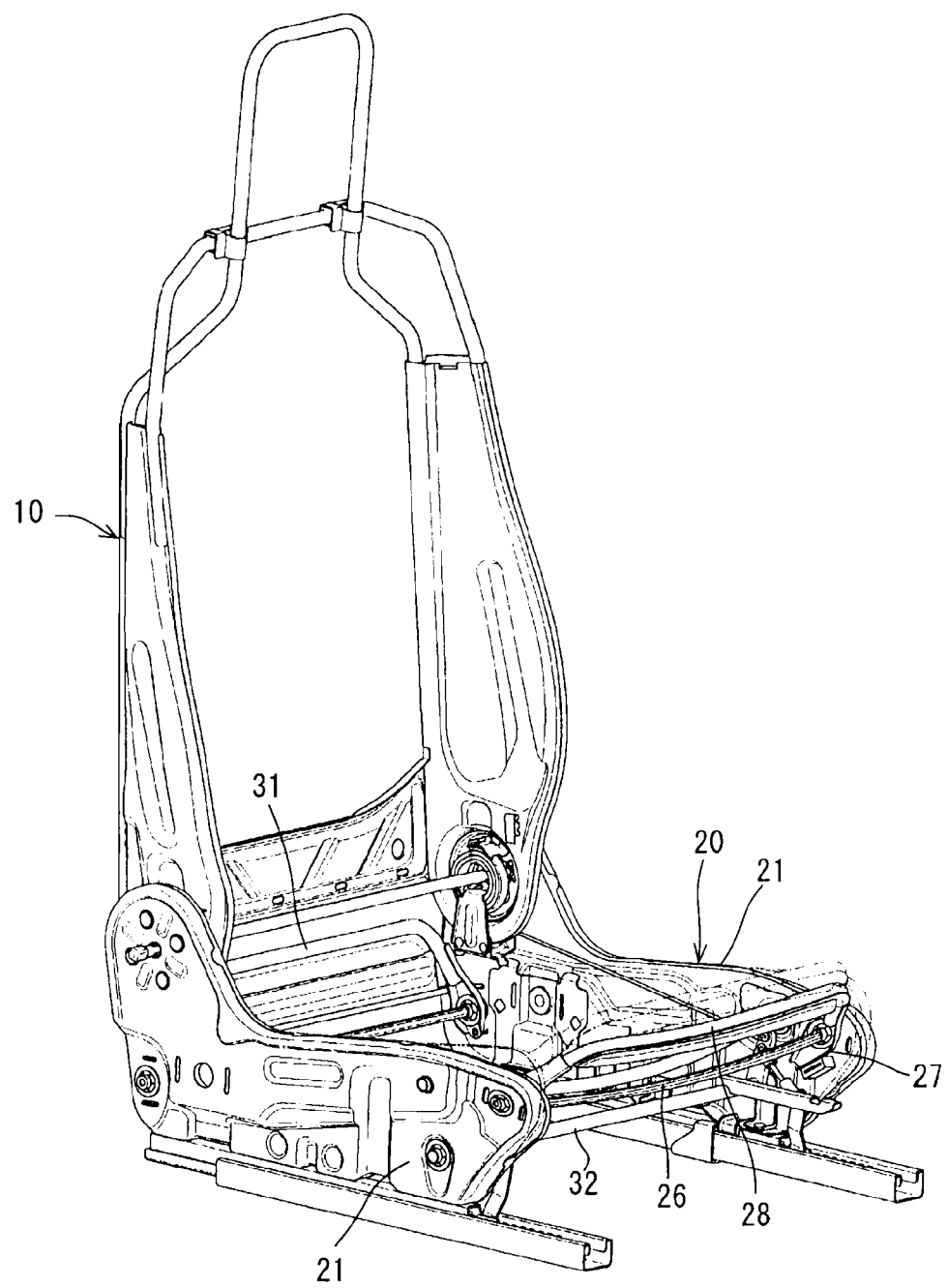
FIG. 11 is a diagram for explaining deformation of the cushion frame in a front collision.

Moreover, if an impact larger than a predetermined level is applied due to a front collision, the impact is absorbed by the following action of the cushion frame 20, which will be described on the basis of FIG. 11. That is, first, upon receipt of an impact, forward and downward forces according to the weight of a human and acceleration are generated. A downward force among them lifts up the front edge side support frame 28 connected to the first torsion bar 26 arranged on the front part. Since the rear edge side support frame 31 supported by the first torsion bar 26 arranged on the rear part rotationally moves forward and downward along with that, the position of the buttocks of the human is stabilized, and a motion of the human to jump out to the front is suppressed. While this motion to jump out to the front is suppressed, the human being collides against the stabilizer 32 and the first torsion bar 26 arranged on the front part, whereby each side frame 21 collapses inward from the vicinity of the front edge thereof and deforms (deforms as illustrated by a solid line from a two-dot chain line in FIG. 11). Due to the inward collapsing deformation of the side frames 21, a tension is further applied to the extended cushion material 33, the side frames 21 and the like further deform while receiving the force generated in the human, and the motion of the human is further suppressed by this deformation. Then, when the vicinity of the front edge of the side frame 21 is brought into contact with the stabilizer 32 and the like, a motion of the human is stopped. The impact energy at the front collision is dispersed by these actions.

TEST EXAMPLE

The natural frequency of the vehicle seat 1 in which the back frame 10 and the cushion frame 20 of this embodiment is formed of an iron material was measured. The measuring method is that the vehicle seat 1 is fixed, acceleration pickups are mounted at measurement points 1 to 6 in FIG. 2, and frequency analysis is made by using hammering at the input points 1 to 4 in FIGS. 1 to 4 and an output of each acceleration pickup.

The measurement point 1 is a position of 400 mm above the center of the reclining mechanism 50 along the side frame 11 of the back frame 10, the measurement point 2 is a position of 100 mm similarly above the center of the reclining mechanism 50 along the side frame 11 of the back frame 10, the measurement point 3 is a position on the side frame 21 of the cushion frame 20 located 80 mm below from the center of the reclining mechanism 50, the measurement point 4 is a position of 340 mm front of the center of the reclining mechanism 50 along the side frame 21 of the cushion frame 20, the measurement point 5 is a lower end of the side frame 11 of the back frame 10, and the measurement point 6 is a rear end of the side frame 21 of the cushion frame 20.

An input point 1 is a position of 550 mm above the center of the reclining mechanism 50 along the side frame 11 and the first pipe frame 121 of the back frame 10, an input point 2 is a position of 170 mm similarly above the center of the reclining mechanism 50 along the side frame 11 of the back frame 10, an input point 3 is a position of 380 mm front from the center of the reclining mechanism 50 along the side frame 21 of the cushion frame 20, and an input point 4 is a center position of the substantially horizontal portion 121b of the first pipe frame 121.

The results are illustrated in FIGS. 13 to 16.

FIG. 13 is a frequency analysis result of each measurement point when an impact is inputted in the right-and-left (transverse) direction from the input point 1, FIG. 14 is a frequency analysis result of each measurement point when an impact is inputted in the right-and-left direction from the input point 2, FIG. 15 is a frequency analysis result of each measurement point when an impact is inputted in the right-and-left direction from the input point 3, FIG. 16 is a frequency analysis result of each measurement point when an impact is inputted in the front-and-rear direction from the input point 4. FIGS. 13 to 15A to 15C and 16A are results of measurement by extending a base net 33 as the cushion material between the front edge side support frame 28 and the rear edge side support frame 31 illustrated in FIG. 10, and FIGS. 13 to 15D to 15F and 16B are results of measurement by removing the base net 33.

On the other hand, FIGS. 17 to 20 are frequency analysis results of measurement similar to the above of a vehicle seat (Comparative Example 1) formed of a seat back, a seat cushion and supporting a seat pad made of a urethane material on a seat spring.

Regarding the natural frequency in the right-and-left direction of the back frame in the seat back, the results of the measurement points 1 and 2 of the side frame 11 of the back frame 10 when the impact was inputted from the input points 1 and 2 were employed. As a result, the results in the case having a base net in this embodiment were 19.75 Hz and 19.50 Hz (FIGS. 13A and 13B, FIGS. 14A and 14B), while the results in the case without a base net were 19.00 Hz and 19.25 Hz (FIGS. 13D and 13E, FIGS. 14D and 14E). On the other hand, in Comparative Example 1, the results were 26.25 Hz (FIGS. 17A and 17B, FIGS. 18A and 18B). Therefore, it is known that the back frame of this embodiment has a structure in which the natural frequency in the right-and-left direction is lower than that of Comparative Example 1 and can easily deflect to the right and left.

Figure 20:
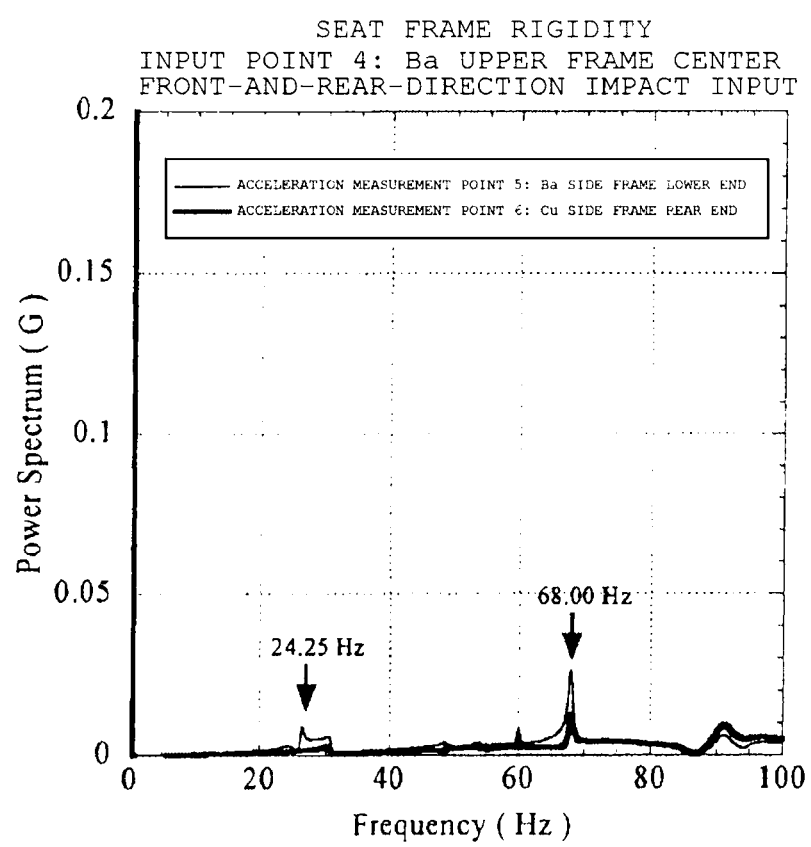
FIG. 20 is frequency analysis results at each measurement point where an impact is inputted in the front-and-rear direction from the input point 4 in a vehicle seat using a seat pad made of a urethane material (Comparative Example 1).

On the other hand, regarding the natural frequency in the front-and-rear direction of the back frame, the result in the case having a base net was 37.75 Hz (FIG. 16A), and the result in the case without a base net was 37.50 Hz (FIG. 16B) in this embodiment, while the result of Comparative Example was 24.25 Hz (FIG. 20). Therefore, in this embodiment, the natural frequency in the front-and-rear direction of the back frame is higher than the natural frequency in the right-and-left direction, and the impact energy in the front-and-rear direction can be easily converted to a motion in the right-and-left direction of the back frame by the difference in the natural frequency, and the effect of dispersing the impact energy is known to be high.

Figure 23:
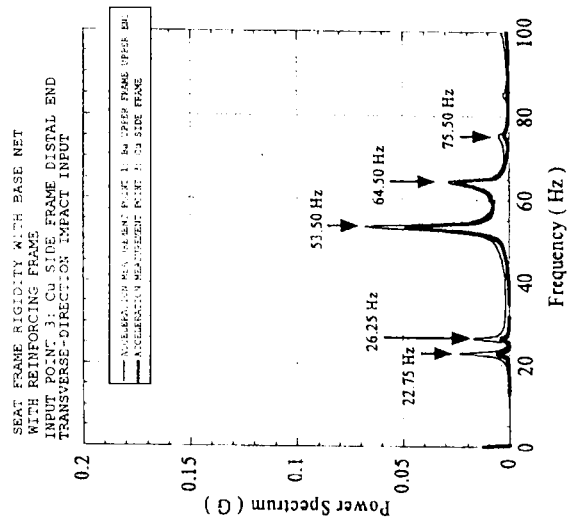
FIGS. 23A to 23C are frequency analysis results at each measurement point where an impact is inputted in the right-and-left direction from the input point 3 if a reinforcing frame is extended between the vicinities close to rear edges of side frames of the cushion frame so as to further raise rigidity (Comparative Example 2).
Figure 23:
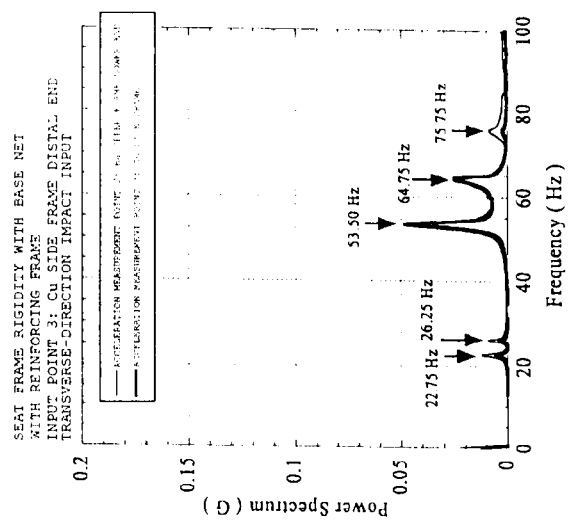
Figure 23:
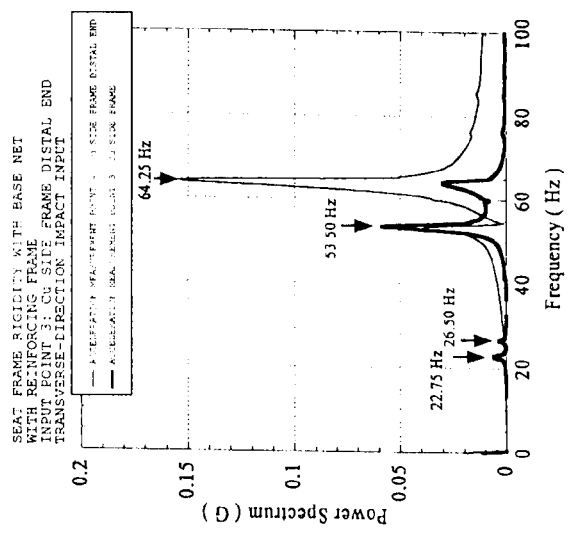

FIGS. 21 to 23 are results of measurement in the vehicle seat in this embodiment described above if the reinforcing frame (not shown) is extended between the vicinities close to the rear edges of the side frames of the cushion frame so as to further improve rigidity (Comparative Example 2). From these results, it is known that the natural frequency in the right-and-left direction of the back frame is 26.25 Hz (FIGS. 21A and 21B, FIGS. 22A and 22B), but high spectrum occurs also at 22.75 Hz and 22.25 Hz, the impact absorbability by the movement in the right-and-left direction is lost, and the structure can easily generate a noise.

Moreover, when the natural frequency in the right-and-left direction of the cushion frame 20 is compared with the power spectrum at the measurement point 3 at which an impact is inputted from the input point 3, the peak frequency in this embodiment is 43.50 Hz, 43.75 Hz (FIGS. 15A to 15C), while the peak frequency is 48.75 Hz and 49.00 Hz (FIGS. 19A to 19C) in Comparative Example 1 and 53.50 (FIGS. 23A to 23C) in Comparative Example 2.

Figure 24:
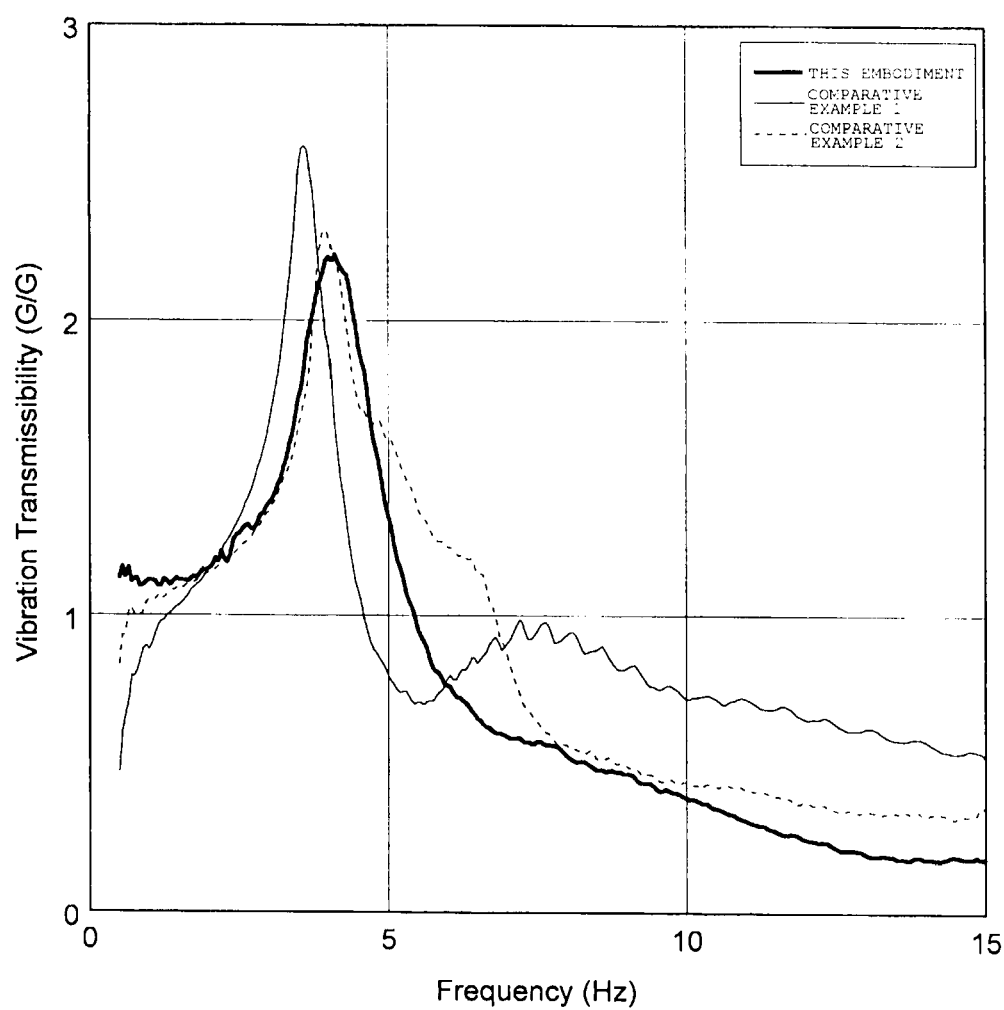
FIG. 24 is a graph illustrating a result obtained by setting each vehicle seat of this embodiment, Comparative Example 1, and Comparative Example 2 on a vibration exciter, vibrating it with a sine wave, and measuring vibration transmission.

FIG. 24 shows results of measurement of vibration transmission by setting each vehicle seat of this embodiment, Comparative Example 1, and Comparative Example 2 on an exciter and by exciting them with a sine wave.

It is known from FIG. 24 that this embodiment and Comparative Example 2 having a framework common to this embodiment have a peak value in vibration transmission lower than Comparative Example 1. Moreover, Comparative Example 1 has a value in vibration transmission higher than those of this embodiment and Comparative Example 2 if 6 Hz is exceeded, and Comparative Example 1 is the poorest in vibration absorbability.

On the other hand, when this embodiment is compared with Comparative Example 2, the peak value is somewhat lower and vibration transmission is considerably lower in 5 to 8 Hz in this embodiment. Moreover, this embodiment is lower also in the region of 10 Hz or more. That is because, since rigidity in the vicinity close to the rear edge of the cushion frame 20 is too high, the right-and-left motion of the back frame 10 is lost, and the vibration absorbability is deteriorated. From these facts, the natural frequency in the right-and-left direction of the back frame 10 is preferably set within a range of 15 to 20 Hz as in this embodiment. Moreover, the natural frequency in the right-and-left direction of the cushion frame 20 (peak value of the power spectrum at the measurement point 3 at which an impact is inputted from the input point 3) is preferably at 50 Hz or less, lower than 53.50 Hz of Comparative Example 2 or more preferably at 45 Hz or less, lower than 49.00 Hz of Comparative Example 1 and the like.

If rigidity is increased by providing the reinforcing frame for increasing rigidity as in Comparative Example 2 or by using high tensile strength steel as a frame material, the natural frequency in the front-and-rear direction is increased and rigidity is improved, but the natural frequency in the right-and-left direction is also increased as above only with that, and impact absorbability by the right-and-left motion is lost. However, in this case, such disadvantages can be solved by increasing the bouncing feeling through enlargement of the diameter of the second torsion bar 29 or further addition of a stabilizer or a torsion bar, for example. That is, since a good balance with the front-and-rear rigidity is important for a favorable right-and-left motion, by increasing the bouncing feeling for the same amount as the increase in the rigidity of the frame itself, high impact absorbability similar to this embodiment can work even if the natural frequency in the right-and-left direction is high (in a range of 25 to 30 Hz, for example).

Moreover, as described above, only the intersection portion where the head rest portion 122b and the substantially horizontal portion 121b of the first frame 121 cross is connected in the structure of the upper end portion of the back frame 10, which can easily move in the right-and-left direction. On the other hand, the lower part of the back frame 10 and the rear part of the cushion frame 20 have rigidity higher than that of the upper part of the back frame 10 and the front part of the cushion frame 20 due to arrangement of the reclining mechanism 50. This is obvious from the fact that the measurement point 1 has a higher gain and a higher bouncing feeling than those of the measurement point 3 when the data of the measurement point 1 and the measurement point 3 in FIGS. 13A and 13B and FIGS. 14A and 14B are compared. Similarly, it is also obvious from the fact that the measurement point 4 located on the front part has a gain and a bouncing feeling higher than those of the measurement point 3 located on the rear part from FIGS. 15C and 15F in the cushion frame 20. As described above, since the rigidity in the vicinity of the lower end portion of the back frame 10 and in the vicinity of the rear end portion of the cushion frame 20 are set relatively high, deformation in the rotating direction around the vicinity of the lower end portion of the back frame 10 can easily occur as described above, which is a structure that can absorb impact energy efficiently.

The cushion frame 20 of this embodiment has a structure in which the bouncing feeling on the front part side is high as described above. On the other hand, in the vehicle seat in Comparative Example 1 (Comparative Example 1) in which a seat pad made of a urethane material is supported has a gain at the measurement point 4 located on the front portion higher than the gain at the measurement point 3 located on the rear portion if an impact is inputted from the front portion of the cushion frame as illustrated in FIG. 19C. That is, the vehicle seat in Comparative Example 1 has the bouncing feeling opposite to that of the cushion frame 20 of this embodiment. That is because a reinforcing frame is extended transversely on the front portion in the cushion frame of Comparative Example 1 having been used in general as a measure against the submarine phenomenon. That is, the cushion frame in Comparative Example 1 has a structure in which not only rigidity on the rear portion is high but also the rigidity on the front portion is further increased so as to receive acceleration and weight when a human is moved at a front collision. On the other hand, the cushion frame 20 of this embodiment has a structure in which the first torsion bar 26 and the stabilizer 32 are extended on the front portion so as to strengthen the bouncing feeling as described above. That is, in this embodiment, the natural frequency in the right-and-left direction of the cushion frame 20 is set higher than the natural frequency in the right-and-left direction of the back frame 10 so as to increase entire rigidity of the cushion frame 20, but this embodiment has a distinctive feature that the bouncing feeling is set higher on the front portion than on the rear portion in the cushion frame 20, that is, the front portion side is configured as an elastic structure. As a result, a human collides against the stabilizer 32 and the first torsion bar 26 arranged on the front portion at the time of a front collision as described above, but the acceleration and weight of the human are damped while being supported due to the elasticity thereof and inward deformation of the side frames 21 from the vicinity of the front edge, and the submarine phenomenon is prevented. Therefore, according to the cushion frame 20 employed in this embodiment, there is no more need to dispose a special member for preventing the submarine phenomenon, which also contributes to weight reduction of the entire seat in that point.

Figure 25:
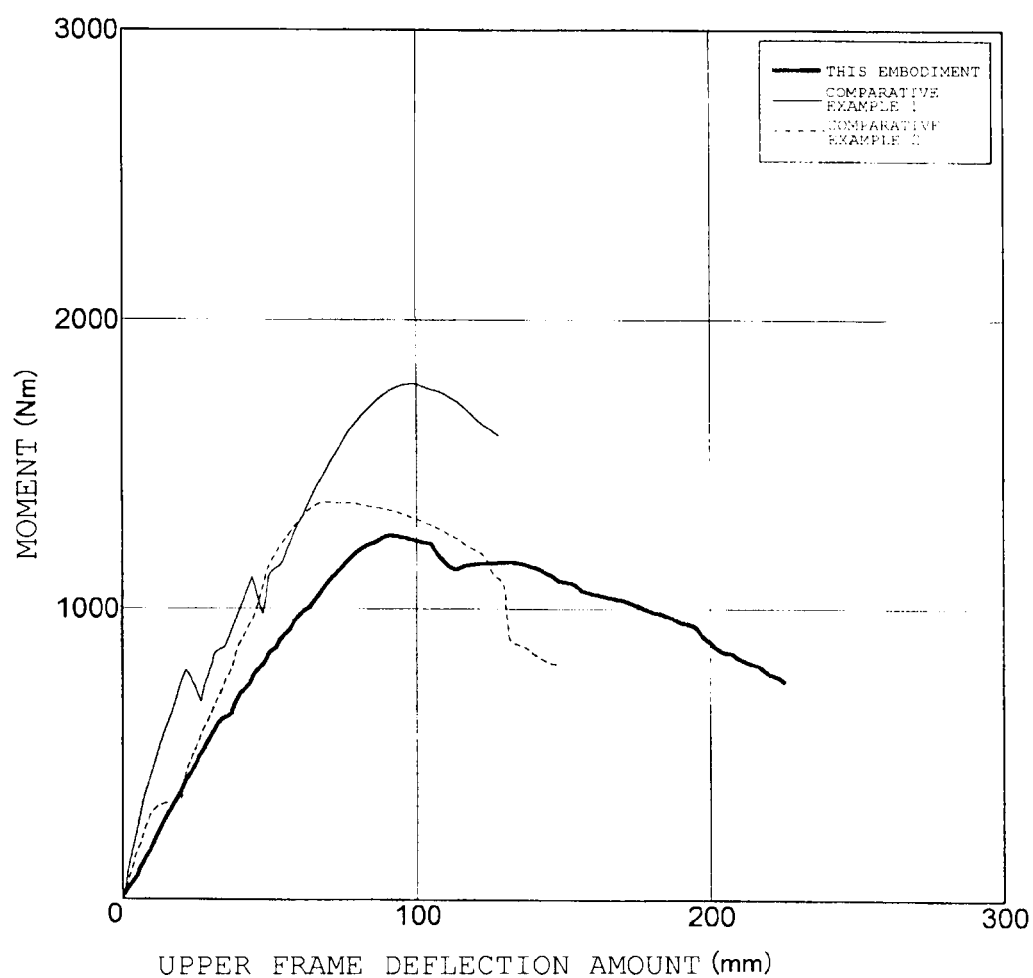
FIG. 25 is a graph illustrating a measurement result of a rearward moment strength test for this embodiment, Comparative Example 1, and Comparative Example 2.

FIG. 25 shows a measurement result of a rearward moment strength test. This test was conducted by applying a force to the back frame at a load speed of 0.5 deg/s through a back pan imitating the shape of a human back part. In Comparative Example 1 the high rearward moment strength is high but the back frame buckles with a deflection amount of approximately 120 mm. Comparative Example 2 has the rearward moment strength lower than that of Comparative Example 1 but the deflection amount of the back frame is 150 mm. On the other hand, in this embodiment, the rearward moment strength is somewhat lower than that of Comparative Example 2 but the deflection amount of the back frame is 240 mm. Moreover, in this embodiment, a change rate becomes smaller after the deflection amount of 40 mm. This is because the strength of the cushion frame 20 in which the whole periphery of the side frames 21 of the cushion frame 20 is hemmed exerts the large action up to the deflection amount of 40 mm and then, the back frame 10 displaced rearward from the deformation allowing portion 11A. Moreover, since the natural frequency in the right-and-left direction of the back frame 10 is low and the upper end of the side frame 11 of the back frame 10 is open, the pipe frame 12 of the back frame 10 can easily move, which largely contributes to displacement up to 240 mm without buckling. From this fact, the vehicle seat 1 of this embodiment can be considered to have high impact energy absorbing efficiency.

REFERENCE SIGNS LIST 1 vehicle seat
10 back frame
11 side frame 111 inner frame
112 outer frame
12 pipe frame
121 first pipe frame
122 second pipe frame
20 cushion frame
21 side frame
211 inner frame
212 outer frame

The invention claimed is:

1. A vehicle seat comprising:
a seat back portion provided with a tension structure extended on a back frame;
a seat cushion portion provided with a tension structure extended on a cushion frame, both being connected through a reclining mechanism;
wherein a pair of side frames of said back frame is each formed so as to have a substantially rectangular closed sectional shape by oppositely arranging an inner frame and an outer frame, each having a predetermined width and length, and provided such that a longitudinal direction thereof is directed substantially along the front-and-rear direction of said back frame;
a first pipe frame which protrudes upward through an upper end opening of each side frame of said back frame and provided between front sides of side frames; and
a second pipe frame provided between depth sides; and
wherein a natural frequency in a right-and-left direction of said back frame is lower than a natural frequency in a front-and-rear direction of said back frame.

2. The vehicle seat according to claim 1, wherein
said back frame and the cushion frame are formed by using an iron material; and
the natural frequency in the right-and-left direction of said back frame is 30 Hz or less.

3. The vehicle seat according to claim 2, wherein
the natural frequency in the right-and-left direction of said back frame is 13 to 27 Hz.

4. The vehicle seat according to claim 1, wherein
said back frame and the cushion frame are formed by using a carbon material; and
the natural frequency in the right-and-left direction of said back frame is 40 Hz or less.

5. The vehicle seat according to claim 4, wherein
the natural frequency in the right-and-left direction of said back frame is 20 to 40 Hz.

6. The vehicle seat according to claim 1, wherein
in said back frame, rigidity in the vicinity of an upper part thereof is lower than the rigidity in the vicinity of a lower part connected to said reclining mechanism.

7. The vehicle seat according to claim 1, wherein
in said cushion frame, rigidity in the vicinity of a front portion thereof is lower than the rigidity in the vicinity of a rear portion connected to said reclining mechanism.

8. The vehicle seat according to claim 1, wherein
the inner frame and the outer frame constituting each side frame of said back frame have peripheral edges fixed and integrated by hemming and the upper end opened.

9. The vehicle seat according to claim 1, wherein
said first pipe frame includes a portion extending upward from the upper end opening of said each side frame and a substantially horizontal portion which connects the portions extending upward to each other;
said second pipe frame includes a portion extending upward from the upper end opening of said each side frame and a substantially U-shaped head rest portion formed protruding further upward from this upward extending portion;
an intersection portion where the substantially horizontal portion of said first frame and the head rest portion of said second pipe frame cross is connected; and
a forward tilting posture is formed so that the upper end position of said head rest portion protrudes more forward.

10. The vehicle seat according to claim 9, wherein
an intersection portion where the substantially horizontal portion of said first frame and the head rest portion of said second pipe frame cross is connected through an elastic member.

11. The vehicle seat according to claim 1, wherein
a reinforcing cross member formed by welding each end portion to said each side frame is preferably provided between the lower portions of the pair of side frames constituting said back frame.

12. The vehicle seat according to claim 1, wherein
the inner frame and the outer frame of each side frame of said back frame are joined by welding, and a deformation allowing portion when an impact larger than a predetermined level is applied is set by the welding range or a position of a heat treatment range to be applied to the inner frame or the outer frame.

13. The vehicle seat according to claim 1, wherein
a pair of side frames of said cushion frame is each formed by oppositely arranging an inner frame and an outer frame, each having predetermined width and length, and by fixing the peripheral edges of the inner frame and the outer frame over the whole periphery by hemming.

14. The vehicle seat according to claim 13, wherein
the inner frame and the outer frame of each side frame of said cushion frame are joined by welding, and a deformation allowing portion when an impact larger than a predetermined level is applied is set by the welding range or a position of a heat treatment range to be applied to the inner frame or the outer frame.

15. The vehicle seat according to claim 1, wherein
the natural frequency of the back frame or a natural frequency of the cushion frame is adjusted to a desired value by a heat treatment condition to be applied to said back frame or the cushion frame.

16. The vehicle seat according to claim 1, further comprising:
each belt anchor member provided with an anchor nut penetrating an inner frame and an outer frame constituting each side frame of said cushion frame; and
a partition wall provided between opposing faces of the inner frame and the outer frame by sandwiching the anchor nut, wherein
a position adjacent to the belt anchor member is set as a deformation allowing portion when an impact larger than a predetermined level is applied.

17. The vehicle seat according to claim 1, further comprising:
a torsion bar arranged in the right-and-left direction in the vicinity of a front edge of said cushion frame;
a pair of arm members protruding in a direction substantially orthogonal to the torsion bar and provided with a predetermined interval;
a support frame extended between the arm members; and
a cushion material supported between the support frame and a rear edge side of said cushion frame.

18. The vehicle seat according to claim 17, further comprising:

a torsion bar arranged in the right-and-left direction in the vicinity of a rear edge of said cushion frame; and a pair of arm members protruding in a direction substantially orthogonal to the torsion bar and provided with a predetermined interval, wherein a support frame is extended between the arm members; and a rear edge side of said cushion material is supported by the support frame.

* * * * *